US008442163B2

(12) United States Patent
Dowling et al.

(10) Patent No.: US 8,442,163 B2
(45) Date of Patent: May 14, 2013

(54) LIST-VITERBI HARD ITERATIVE DECODER FOR MULTILEVEL CODES

(76) Inventors: Eric Morgan Dowling, Escazu (CR); John P. Fonseka, Plano, TX (US)

(*) Notice: Subject to any disclaimer, the term of this patent is extended or adjusted under 35 U.S.C. 154(b) by 735 days.

(21) Appl. No.: 12/461,749

(22) Filed: Aug. 24, 2009

(65) Prior Publication Data

US 2011/0044399 A1 Feb. 24, 2011

(51) Int. Cl.
*H04L 27/06* (2006.01)
(52) U.S. Cl.
USPC ........... 375/341; 375/262; 375/264; 375/265; 375/340; 375/342; 704/242; 714/792; 714/794; 714/795; 714/796; 714/810
(58) Field of Classification Search .................. 375/262, 375/264, 265, 341, 340; 704/242; 714/794, 714/795, 796, 810
See application file for complete search history.

(56) References Cited

U.S. PATENT DOCUMENTS

| 4,713,817 | A | 12/1987 | Wei |
| 5,258,987 | A | 11/1993 | Wei |
| 5,329,551 | A | 7/1994 | Wei |
| 5,535,228 | A | 7/1996 | Dong et al. |
| 5,548,615 | A | 8/1996 | Wei |
| 5,654,986 | A | 8/1997 | Lim |
| 6,034,996 | A | 3/2000 | Herzberg |
| 6,115,427 | A | 9/2000 | Calderbank et al. |
| 6,266,795 | B1 | 7/2001 | Wei |
| 6,351,832 | B1 | 2/2002 | Wei |
| 6,473,878 | B1 | 10/2002 | Wei |
| 6,516,037 | B1 | 2/2003 | Wei |
| 6,769,091 | B2 | 7/2004 | Classon |
| 6,889,355 | B1 | 5/2005 | Calderbank et al. |
| 7,197,690 | B2 | 3/2007 | Shen et al. |
| 7,856,591 | B2* | 12/2010 | Shi et al. ........................ 714/795 |
| 2004/0260997 | A1* | 12/2004 | Kuwahara ...................... 714/755 |
| 2005/0022101 | A1* | 1/2005 | Malm et al. ................... 714/801 |
| 2005/0166132 | A1 | 7/2005 | Shen et al. |
| 2007/0198895 | A1* | 8/2007 | Paumier et al. ............... 714/774 |
| 2009/0132893 | A1* | 5/2009 | Miyazaki et al. ............. 714/776 |
| 2009/0249160 | A1* | 10/2009 | Gao et al. ...................... 714/752 |

OTHER PUBLICATIONS

N. Seshadri and C. W. Sundberg, "Multilevel trellis-coded modulations for the Rayleigh fading channel," *IEEE Trans. Commun.*, vol. 41, No. 9, pp. 1300-1310, Sep. 1993.

A. Gatherer and A. Murtaza, "Analysis and improvement of the J.83 Annex B trellis code for cable modems," 32nd Asilomar Conference on Signals, Sys. & Comp, pp. 1773-1777, Nov. 1998.

(Continued)

*Primary Examiner* — Sam K Ahn
*Assistant Examiner* — Sophia Vlahos
(74) *Attorney, Agent, or Firm* — Eric M. Dawling

(57) ABSTRACT

Two decoding algorithms are introduced for the decoding of multi-level coded modulation and other types of coded modulation involving component codes and interleaving operations. An improved hard iterative decoding (IHID) algorithm is presented that improves upon a hard iteration decoding technique by adding a stopping criterion. Also, a list Viterbi hard iteration decoding (LV-IHID) algorithm is presented that employs list decoding in conjunction with the IHID algorithm. Both of these decoding algorithms improve upon conventional multi-stage decoding by reducing the effective error multiplicity that is observed at the lowest coding level. It is demonstrated that the LV-IHID algorithm performs close to soft iterative decoding. The computational and delay complexity of the proposed decoding algorithms compare favorably with soft iterative decoding strategies. Also, a novel labeling strategy for MLC design is presented.

31 Claims, 19 Drawing Sheets

OTHER PUBLICATIONS

S-M Yang, W-K Cheng, and J. Shen, "LSB-coded modulation and its application to microwave digital radios," IEEE pp. 1243-1247, 1996.

H. Iami and S. Hirakawa, "A new multilevel coding method using error-correcting codes," IEEE Trans Inform. Theory, vol. IT-23, No. 3, pp. 371-373, May 1977.

L.-F. Wei, "Coded modulation with unequal error protection," IEEE Trans Comm., vol. 41, No. 10, pp. 1439-1449, Oct. 1993.

M. Isaka et al., "Multilevel coded 16-QAM modulation with multistage decoding and unequal error protection," Globecom 1998.

M. Isaka, et al., "Multilevel coded modulation for unequal error protection and multistage decoding—part II: asymmetric constellations," *IEEE Trans. Commun.*, vol. 48, No. 5, pp. 774-786, May 2000.

G.D. Forney, "Coset codes—part I: introduction and geometrical classification," IEEE Trans Inform. Theory, vol. 34, No. 5, pp. 1123-1151, Sep. 1988.

G.D. Forney, "Coset codes—part II: binary lattices and related codes," IEEE Trans Inform. Theory, vol. 34, No. 5, pp. 1152-1187, Sep. 1988.

H. Kaneko et al., "Nonsystematic M-ary asymmetric error correcting codes designed by multilevel coding method," Proc. $10^{th}$ IEEE Pac Rim Int. Symp on Dependable Computing, 2004.

D. Divsalar, et al., "Trellis coding with asymmetric modulations," IEEE Trans Comm., vol. COM-35, No. 2, pp. 130-141, Feb. 1987.

R.J. van der Vleuten and J. Weber, "Optimized signal constellations for trellis-coded modulation on an AWGN channels," IEEE Trans Comm., vol. 44, No. 6, pp. 646-648, Jun. 1996.

J. Huber, "Multilevel-codes: Distance profiles and channel capacity," ITG-Fachberichte, Oct. 1994.

U. Wachsmann, R. F. H. Fischer and J.B. Huber, "Multilevel codes: theoretical concepts and practical design rules," IEEE Trans Inform. Theory, vol. 45, No. 5, pp. 1361-1391, Jul. 1999.

J. Huber, U. Wachsmann, and R. Fischer, "Coded modulation by multilevel codes: overview and state of the art," ITG-Fachberichte, Mar. 1998.

R. Fischer, J. Huber and U. Wachsmann, "On the combination of multilevel coding and signal shaping," ITG-Fachberichte, Mar. 1998.

U. Wachsmann, R. F. H. Fischer and J.B. Huber, "Multilevel coding: use of hard decisions in multistage decoding," ITG-Fachberichte, Mar. 1997.

M. J. Borran, B. Aazhang, "Multilevelcodes and iterative multistage decoding: rate design rules and practical considerations" Proc IEEE Wireless Comm and Networking (WCNC), 2000.

T. Woerz and J. Hagenauer, "Iterative decoding for multilevel codes using reliability information," IEEE Globecomm, pp. 1779-1784, 1992.

P. A. Martin and D.P. Taylor, "On multilevel codes and iterative multistage decoding," IEEE Trans. Comm., vol. 49, No. 11, Nov. 2001.

A. R. Calderbank, "Multilevel codes and multistage decoding," *IEEE Trans. Commun.*, vol. 37, pp. 222-229, Mar. 1989.

J.N. Livingston and H.G. Jardak, "The performance of multilevel coding employing hard decision and hybrid decoders on fading and Gaussian channels," *IEEE Trans. Commun.*, vol. 43, pp. 671-673, Feb./Mar./Apr. 1995.

H. Herzberg, "On the spectrum of distances of a multilevel code, decoded by a multistage decoder," *IEEE Trans. Inf. Theory*, vol. 43, pp. 1736-1740, Sep. 1997.

G. J. Pottie and D. P. Taylor, "Multilevel codes based on partitioning," IEEE Trans. Inform. Theory, vol. 35, pp. 87-98, Jan. 1989.

N. Seshadri and C-E. W. Sundberg, "List Viterbi decoding algorithms with applications," *IEEE Trans. Commun.*, vol. 42, pp. 311-323, Feb./Mar./Apr. 1994.

M. Röder and R. Hamzaoui, "Fast tree-trellis list Viterbi decoding," *IEEE Trans. Commun.*, vol. 54, No. 3, pp. 453-461, Mar. 2006.

G. Ungerboeck, "Channel coding with multilevel/phase signals," *IEEE Trans. Inform. Theory*, vol. IT-28, pp. 55-67, Jan. 1982.

M. Isaka and H. Imai, "On the iterative decoding of Multilevel codes," *IEEE J. Select. Areas Commun.*, vol. 19, pp. 935-943, May 2001.

R.Y. Shao et al. "Two simple stopping criteria for turbo decoding," *IEEE TCOM*, vol. 47, No. 8, pp. 1117-1120, Aug. 1999.

W. Zhanji et al, "A new parity-check stopping criterion for turbo decoding," *IEEE TCOM* vol. 12, No. 4, pp. 304-306, Apr. 2008.

F. Zhai and I. J. Fair, "Techniques for early stopping and error detection in turbo decoding," *IEEE TCOM*, vol. 51, No. 10, pp. 1617-1623, Oct. 2003.

\* cited by examiner

TABLE I

COMPARISON OF COMPLEXITY BETWEEN IHID AND LV-IHID ALGORITHMS USING UNITS OF RELATIVE MSD COMPLEXITY**

| SNR (dB) | IHID Average Number of Total Iterations* | LV-IHID Average Number of Total Iterations* due to IHID Operation | LV-IHID Average Number of List Viterbi Operations |
|---|---|---|---|
| 4.0 | 3.14 | 15.30 | 3.51 |
| 4.2 | 3.03 | 15.16 | 3.47 |
| 4.4 | 3.00 | 13.53 | 2.98 |
| 4.6 | 2.99 | 12.61 | 2.74 |
| 4.8 | 2.95 | 10.47 | 2.10 |
| 5.0 | 2.71 | 8.39 | 1.62 |
| 5.2 | 2.53 | 7.14 | 1.37 |
| 5.4 | 2.34 | 5.88 | 1.10 |
| 5.6 | 2.20 | 5.38 | 1.04 |
| 5.8 | 2.08 | 5.17 | 1.01 |
| 6.0 | 1.99 | 5.03 | 1.01 |
| 6.2 | 1.90 | 4.98 | 1.01 |
| 6.4 | 1.80 | 4.88 | 1.01 |

* 1 Iteration is equal to 1 Complete Multi-stage Decoding

** Based on the results of FIG. 10, the IHID algorithm can be properly operated with an SNR of 6.4 dB and above while the LV-IHID can be operated with an SNR of 5.4 dB and above. The higher complexities at lower SNR are indicative of ill convergence effects below the above-indicated threshold SNR values.

FIG. 12

LIST-VITERBI HARD ITERATIVE DECODER FOR MULTILEVEL CODES

BACKGROUND OF THE INVENTION

1. Field of the Invention

This invention relates generally to coded modulation techniques for use in digital communication systems. More particularly, the invention relates to methods and apparatus for the encoding and decoding multilevel coded and related codes such as serial and parallel concatenated coded signals. An improved hard iterative decoder is used to achieve near maximum likelihood performance at a much lower computational cost.

2. Description of the Related Art

Multi-level coding (MLC), devised by Imia and Hirakawa, and later studied and applied by many others in the literature, is a powerful coded modulation technique for bandwidth limited channels (see the reference list provided in the attached IDS for the key prior art referred to herein). MLC schemes employ individual (binary) component codes to protect each information bit. Staring from a high power low rate code for least significant bits (LSB) i.e. the lowest level, MLC schemes lower the code power (and increases the rate) as they move to higher level bits. The most significant bits (MSB) i.e. the highest level, are either kept uncoded or use the lowest power high rate code. The coded bits are then mapped on to a constellation point as illustrated in FIG. 1. MLC, in contrast to Ungerboeck's trellis coded modulation (TCM), provides flexibility in the code rate selection at each level. Various types of codes like block codes, convolutional codes, turbo codes and the like can be employed as component codes at each level. In addition, MLC schemes can be decoded using a simple multi stage decoding (MSD) where the codes are individually decoded.

MSD of MLC has been documented and analyzed in the literature. MSD starts decoding at the first level and moves up one level at a time using the knowledge of the coded bits that have already been decoded. In the first level, the coded bits at all higher levels are assumed to be equiprobable, and hence, the first level suffers from a high path multiplicity. In order to overcome these drawbacks of MLC, interleaving between levels and iterations among levels have been proposed. Interleaving spreads out errors that occur in any code with respect to all other codes and reduces the chances of error propagation. Hard iterations have been proposed where hard decoding decisions from a previous MSD run are used in a next MSD run. It has been shown in the literature that such MSD iterations along with interleaving can reduce the impact of path multiplicity thereby improving performance.

Huber et al. have shown that MSD is sufficient to decode MLCs and to approach capacity if the code rates at each level are selected according to the capacity rule. However, MLC schemes designed according to the capacity rule may not achieve the optimum error coding exponent especially for shorter block lengths. Also, it is known that the MLC schemes designed according to the capacity rule have excellent performance over known channels, however, their performance suffer in presence of channel variations. Of particular interest to the present invention is the case where MLC schemes are designed to achieve the same minimum Euclidean distance at all coding levels. This rule that maintains the same minimum distance and targets similar performances at all levels is called the balance distances rule. In general the MLC schemes designed according to the balance distances rule can achieve channel capacity with optimal decoding using overall maximum likelihood (ML) decoding. However, such a ML receiver that operates on the hybrid trellis is impractical due to the large number of states on the hybrid trellis.

Methods have been developed that employ hard iterative decoding to further improve decoding of MLCs by reducing or eliminating the additional path multiplicity that is not resolved by the MSD. So far in the literature, iterations have been discussed for a pre-selected number of iterations. The acceptable number of iterations depends on the component codes, constellation mapping policy and on the value of the signal to noise ratio (SNR). Iterating with a pre-selected number of iterations is an ad-hoc approach and is suboptimal.

On the other hand, iterating with a terminating policy is the optimal way to run iterations thereby reaching a target solution with a minimum number of iterations. Lacking from the prior art is such a termination policy. It would be desirable to have such a termination policy and to use it to construct an improved hard iteration decoding (IHID) algorithm. Also desirable would a list Viterbi IHID (LV-IHID) algorithm, which employs list Viterbi decoding to widen the range of SNR values where the IHID algorithm can provide near-ML performance. More generally, it would be desirable to have a class of methods and apparatuses that could use multiple instances of the IHID algorithm, starting from multiple starting points, to terminate on multiple candidate termination points, the best of which being used to select a highly probable candidate solution that performs statistically similarly to the maximum likelihood solution.

SUMMARY OF THE INVENTION

The present invention solves these and other problems by providing methods and apparatus for improved hard iterative decoding of multilevel codes (MLCs) and similar codes involving component codes and interleaving. The invention is based upon an observation used to provide a necessary condition that hybrid trellis paths of an MLC must meet in order to be the maximum likelihood (ML) solution. An improved hard iterative decoding (IHID) algorithm and related methods and apparatuses are presented that iteratively search until a candidate hybrid trellis path is found that meets the necessary condition. Enhanced decoders use this concept by defining multiple starting points from which to start multiple searches that result in identifying multiple candidate solutions, the best of which is assumed to be the candidate ML solution.

One aspect of the present invention centers on improved hard iterative decoding. For example, a method can be stated for decoding a multi-level encoded signal that is encoded in accordance with at least two coding levels, to include a lower coding level and an upper coding level. The method involves performing hard iterations, with various stopping criteria as indicated below.

In one type of embodiment, a digitized representation of a communication signal representative of the multi-level encoded signal is used to compute a first set of branch metrics, for example, by assuming the upper level code words are equiprobable. Distances between received signal samples and a set of constellation points are computed. A subset of the first set of branch metrics are selected for use in subsequent decoding to compute a first lower-level decoded sequence. Next an inherently assumed upper-level sequence that is based upon the selected subset of the first set of branch metrics is identified. The first lower-level decoded sequence is then used with the distances to identify and/or compute a set of upper-level branch metrics. At least some of these upper level branch metrics are used to compute a first upper-level decoded sequence. For example, the branch metrics can be used in a Viterbi decoder and the Viterbi decoding algorithm can be used to compute the decoded sequences, but other decoding algorithms can also be used to compute the decoded sequences based upon the branch metrics.

A first stopping condition is that if the inherently assumed upper-level sequence equals the first upper-level decoded sequence, then the first lower-level decoded sequence and the first upper-level decoded sequence are accepted as decoder outputs. If this first stopping condition is not met, the first upper-level decoded sequence and the digitized representation are then used to compute a modified set of lower-level branch metrics. The modified set of lower-level branch metrics are then used to compute a modified lower-level decoded sequence.

A second stopping condition is that if the modified lower-level decoded sequence is equal to the first lower-level decoded sequence, the modified lower-level decoded sequence and the first upper-level decoded sequence are accepted as decoder outputs. If this second stopping condition is not met, the modified lower-level decoded sequence and the digitized representation are used to compute a modified set of upper-level branch metrics, and the modified set of upper-level branch metrics are used to compute a modified upper-level decoded sequence.

A third stopping condition is that if the modified upper-level decoded sequence is equal to the first upper-level decoded sequence, the modified lower-level decoded sequence and the modified upper-level decoded sequence are accepted as decoder outputs. If this third stopping condition is not met, the modified upper-level decoded sequence and the digitized representation are used to compute a twice modified set of lower-level branch metrics, and the twice modified set of lower-level branch metrics are used to compute a twice modified lower-level decoded sequence. From here, the second and third stopping criteria can be used repeatedly, by induction, until a stopping condition is satisfied.

Other aspects of the present invention exist, such as interleaving operations to minimize error levels, receiver structures, decoder structures, and system level embodiments. In some cases, other types of codes can be used that are not parts of multilevel codes, for example parallel or serial concatenated codes can be used with the iterations of the present invention. These various aspects are described more fully in the description of the preferred embodiments which follows.

BRIEF DESCRIPTION OF THE DRAWINGS

The various novel features of the present invention are illustrated in the drawings listed below and described in the detailed description that follows.

FIG. 12 is a table illustrating computational complexity of the IHID and LV-IHID algorithms

DETAILED DESCRIPTION OF THE PREFERRED EMBODIMENTS

Figure 1:
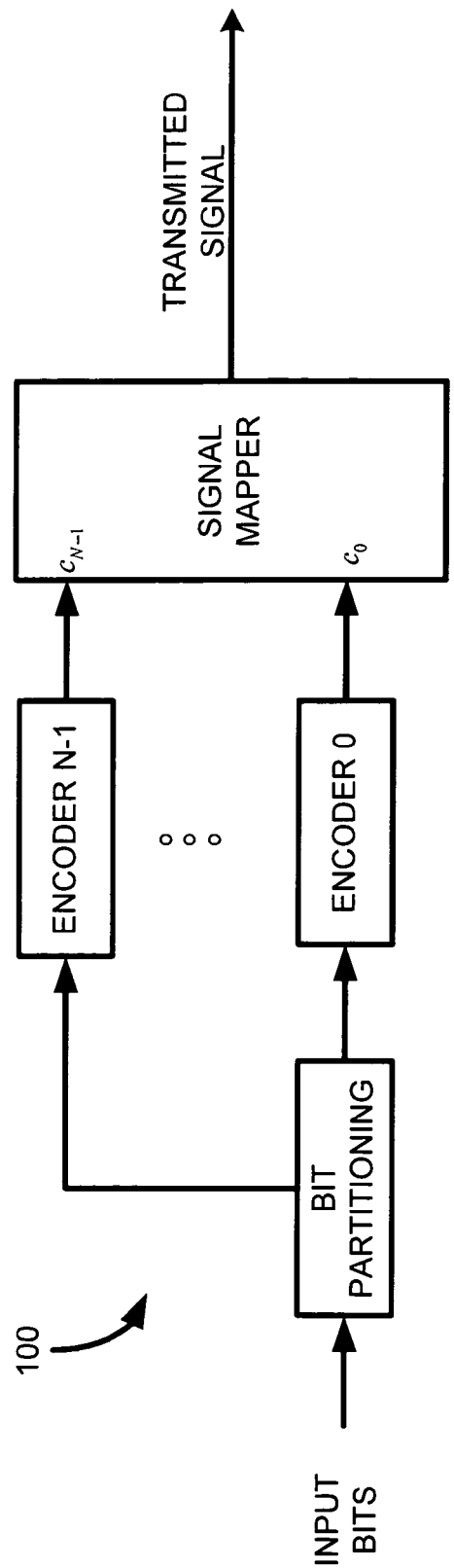
FIG. 1 is a block diagram illustrating a Multilevel Encoder
Figure 2A:
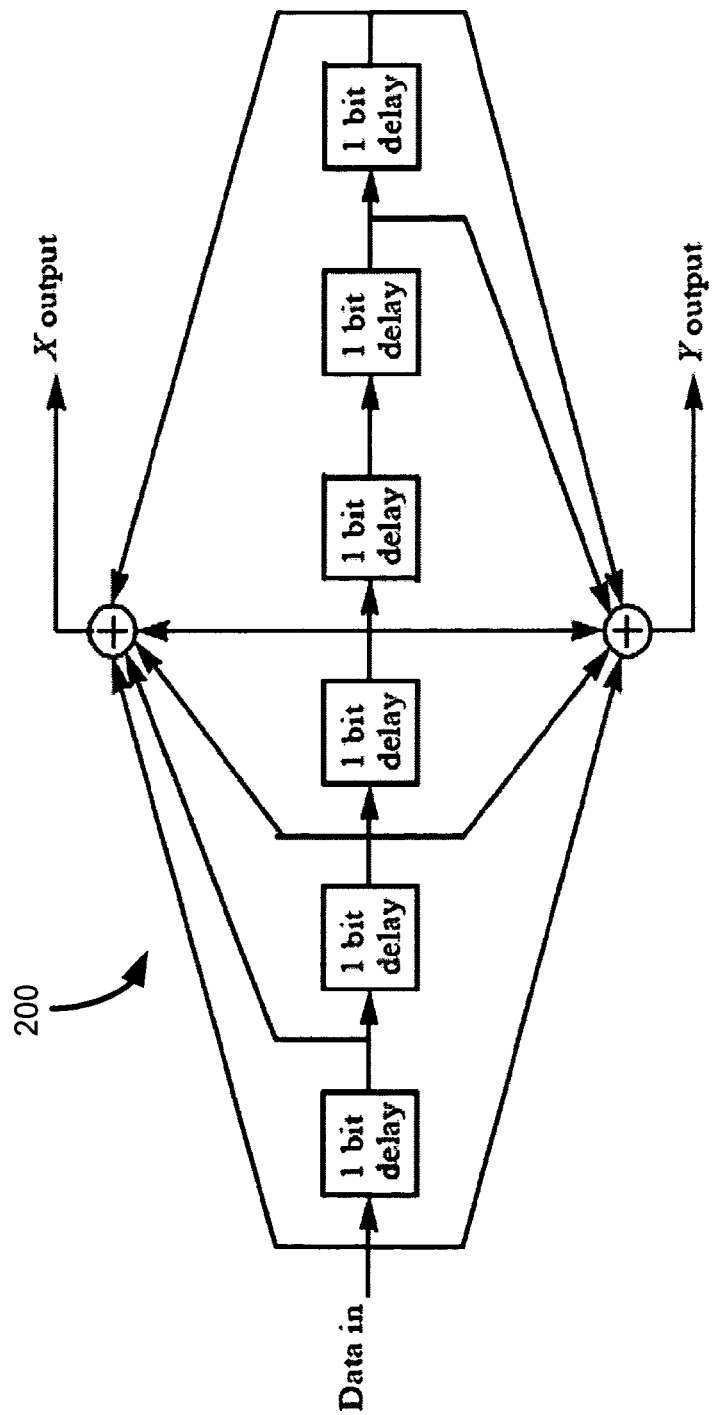
FIG. 2A illustrates a convolutional coder used in the WiMAX standard for rate ¾ encoding of a 16-QAM constellation. This convolutional coder is used an exemplary encoder to code the BC in a preferred embodiment of the present invention.
Figure 2B:
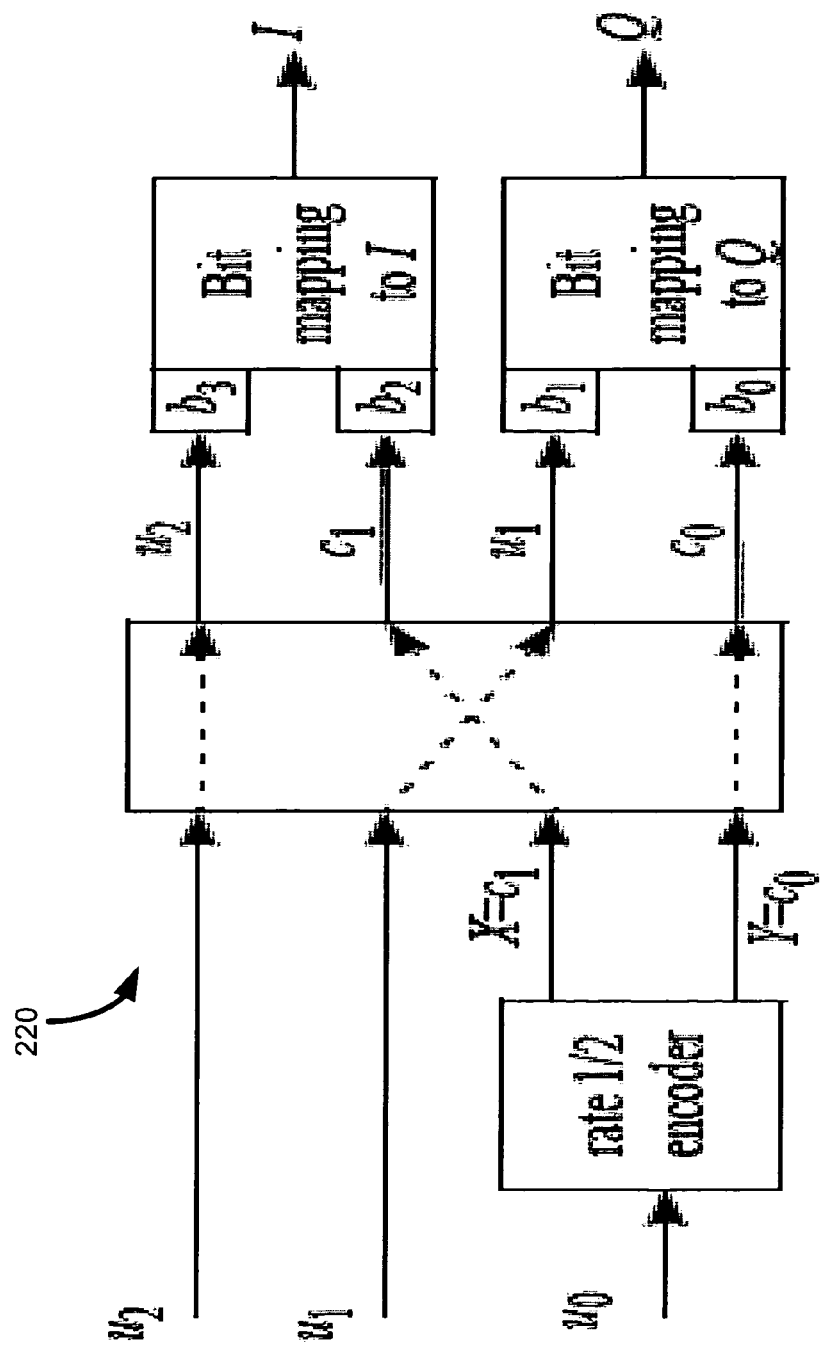
FIG. 2B is a block diagram illustrating how bits are mapped onto the WiMAX trellis coded 16-QAM constellation.

The description of the preferred embodiments is presented as a sequence of sections as indicated below.
I. Exemplary MLC Scheme and Building-block Labeling Approach The trellis coded scheme shown in FIG. 2 has been adopted for use in the IEEE 802.16a (WiMAX) Standard [FIG. 161, FIG. 163 ]. As shown in FIG. 2A, this scheme uses a rate ½ convolutional code with memory υ=6 and a free Hamming distance of $d_{free}=10$. In the IEEE 802.16a standard, the two coded bits, x, y, are mapped respectively to the LSBs of the in-phase (I) and quadrature-phase (Q) channels. One uncoded MSB is added to each of the x and y bits, so that a total of two coded bits and two uncoded bits are used to select a 16-QAM constellation point as shown in FIG. 2B. Using a constellation similar to that shown in FIG. 4A, constellation points are separated by a minimum distance of $D^2=4a^2$. Therefore, the shortest merging event has a raw minimum squared Euclidean distance (MSED) of $(d_{free})(D^2)=10D^2=40a^2$. However, when the coded LSBs are tiled using two uncoded MSBs to produce the 16-QAM constellation of FIG. 4A, the uncoded MSBs select a tile center ($\pm 2a$, $\pm 2a$) and are thus separated by a distance $D^2=16a^2<40a^2$. This gives rise to direct paths on the trellis that reduce the MSED of the overall coded 16-QAM scheme in FIG. 2 to $D^2=16a^2$. Hence, the coding power of the convolutional code is in some sense sacrificed by the overall scheme due to the imbalance in the minimum Euclidean distance created by the direct merging events caused by the uncoded bits.

Figure 3:
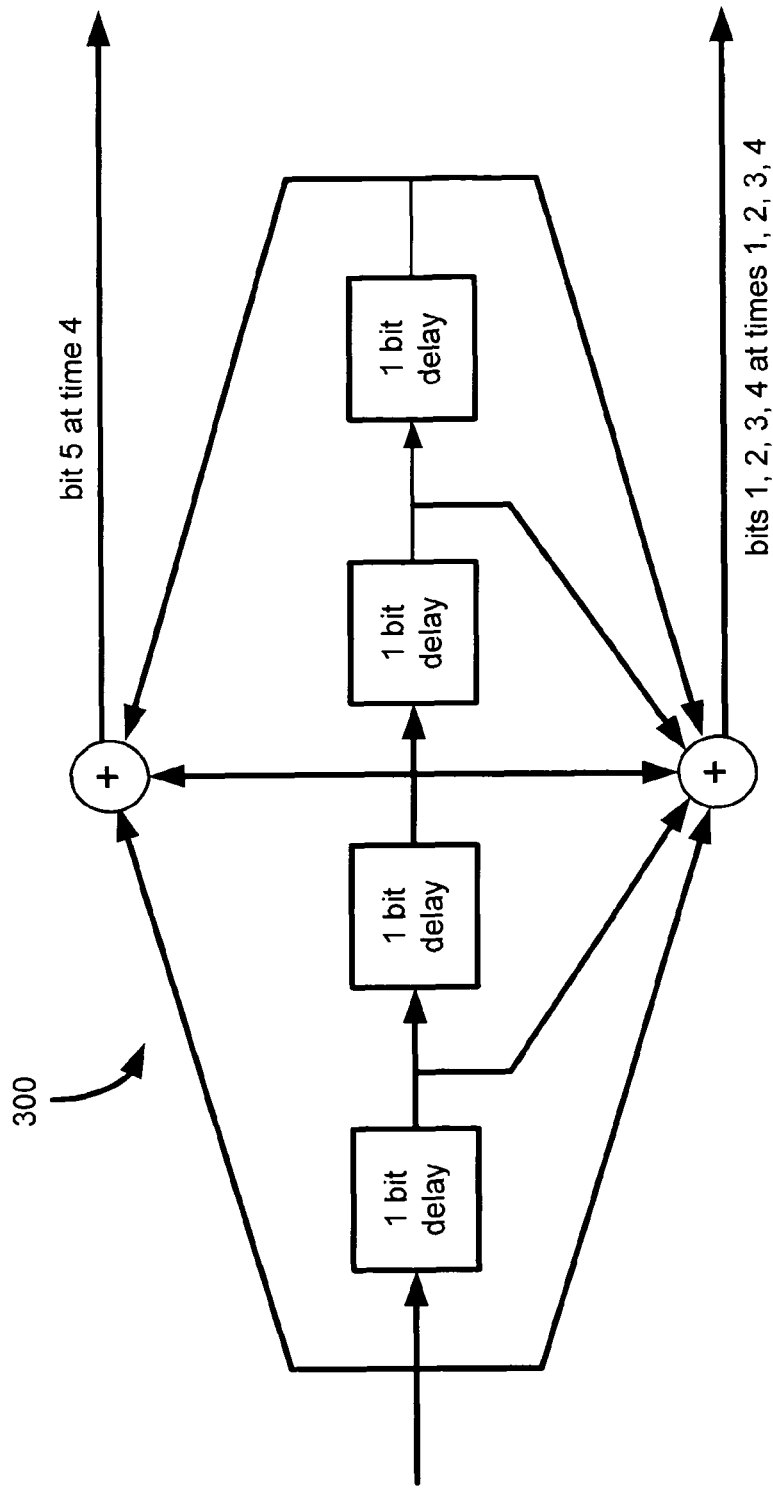
FIG. 3 illustrates a convolutional coder used in the J.83 standard. This convolutional coder is twice used an exemplary encoder to generate each of two TC bits, one for the I-channel and one for the Q-channel, in a preferred embodiment of the present invention.

Since a trellis coded scheme can be viewed as a two-level MLC scheme with the upper level uncoded, the above scheme can be improved by introducing a second level code on the currently uncoded bits. In order to maintain the overall raw minimum distance of $D^2=40a^2$, a rate $4/5$ punctured convolutional code shown in FIG. 3 that has minimum Hamming distance of $d_{free}=3$ can be applied separately on each of the uncoded bits, one on the I channel and the other on the Q channel. It is noted that the code shown in FIG. 3 is adopted in the J.83 standard. The code shown in FIG. 3 increases the raw minimum distance of original uncoded bits from $D^2=16a^2$ to $(d_{free})(D^2)=(3)(16a^2)=48a^2 \geqq 40a^2$ maintaining the overall raw minimum distance at $40a^2$ which is determined by the lower level code. In this MLC scheme, 2.6 information bits are transmitted during every interval, one through the rate-$\frac{1}{2}$ lower level and 0.8 through each of the two rate-$4/5$ upper level encoders. Hence, the average bit energy is $$E_b = \frac{10a^2}{2.6}, \quad (1)$$

and the normalized MSED is $$d_{min}^2 = \frac{D_{min}^2}{2E_b} = \frac{40a^2}{2E_b} = 5.2. \quad (2)$$

Traditionally, Ungerboeck's set partitioning is used to design MLC schemes. Set partitioning starts with a full constellation and breaks it down into subsets and thereby designs the MLC from top to bottom. The labeling strategy of the present invention is called the building block approach and builds the constellation from the bottom up. To understand the approach, start with a MLC with two coding levels as described above, where each coding level includes two coded bits. This gives a total of four coded bits per constellation point. These four coded bits are then mapped to the 16-QAM constellation depicted in FIG. 4A. The two LSBs out of the four coded bits correspond to the lowest coding level which is called the "Building-block Code" (BC). Each pair of BC coded bits can be viewed as being mapped onto an equivalent channel that corresponds to the 4-QAM constellation as shown in FIG. 4B. The two MSBs correspond to a higher coding level which is called the "tile code" (TC). Each pair of TC coded bits select a "tiling point" which corresponds to one of four possible tile centers, ($\pm 2a$, $\pm 2a$) of the four possible tiles, $T_0, \ldots T_3$. The two TC bits thus select a tile (i.e., a quadrant in this example) while the two BC bits select one of four constellation points inside the selected quadrant. Viewed another way, the two MSBs of the MLC cause the BC's 4-QAM constellation of FIG. 4B to be replicated, or tiled, by mapping the origin of FIG. 4B four times, to the four tile centers, ($\pm 2a$, $\pm 2a$). This tiling operation generates the 16-QAM constellation of FIG. 4A. By considering the centers of the tiles $T_0, \ldots T_3$ to be "tiling points," one can also view the TC as being mapped to an equivalent channel that corresponds to a 4-QAM tiling constellation similar to the BC's equivalent channel of FIG. 4B, but with four tiling points at ($\pm 2a$, $\pm 2a$).

The set partitioning and building block approaches arrive at the same basic partitioning and labeling. For example, note that each tiled building block of FIG. 4A contains four points, one point from each subset as defined by the set partitioning technique. However, the building-block approach allows one to directly design MLCs to meet the balanced distances rule by systematically selecting the codes to be used at each level so that the MSED at each level is no less than a prescribed minimum for the entire MLC scheme. Also, viewing the mapping in terms of building blocks as done here is more suitable for MLC as it can be used to extend an existing coded constellation to higher order constellations by adding additional coding levels (see section VII for further details).

Figure 4A:
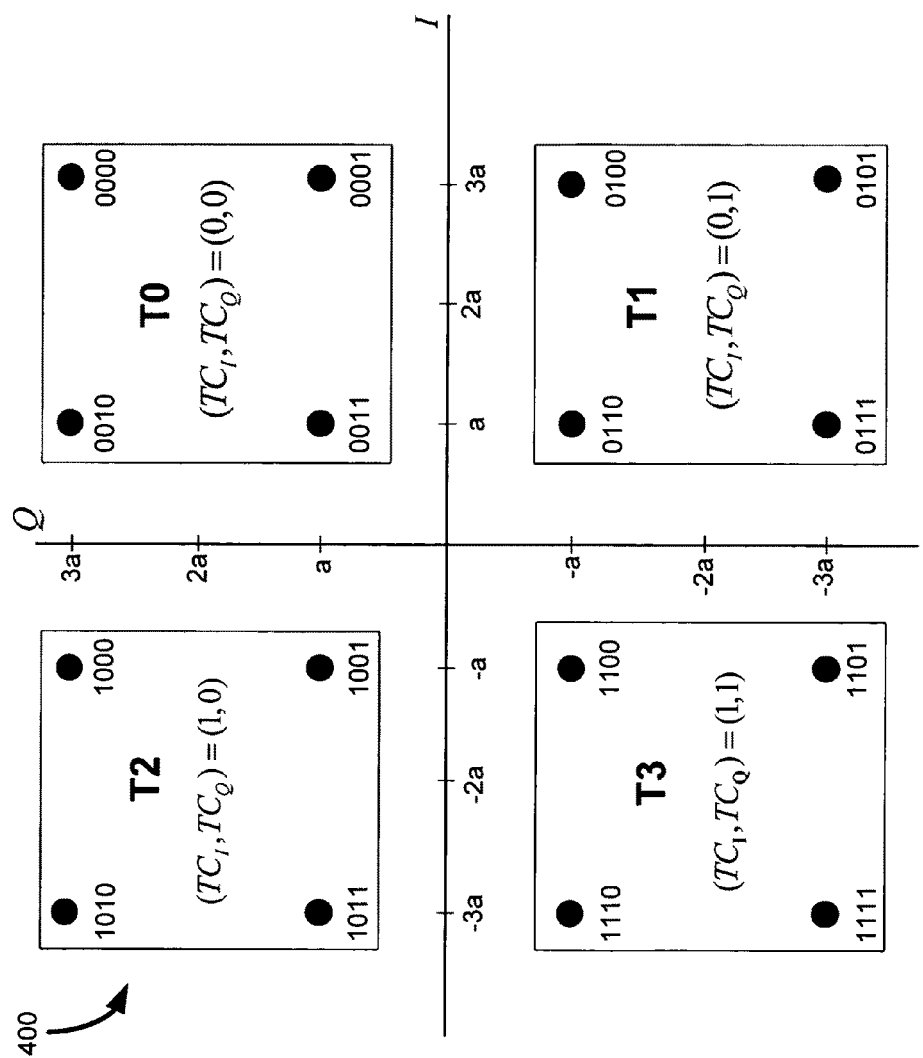
FIG. 4A illustrates a coded 16-QAM constellation implemented as a tiling of four replicas of a 4-QAM coded building block constellation.
Figure 4B:
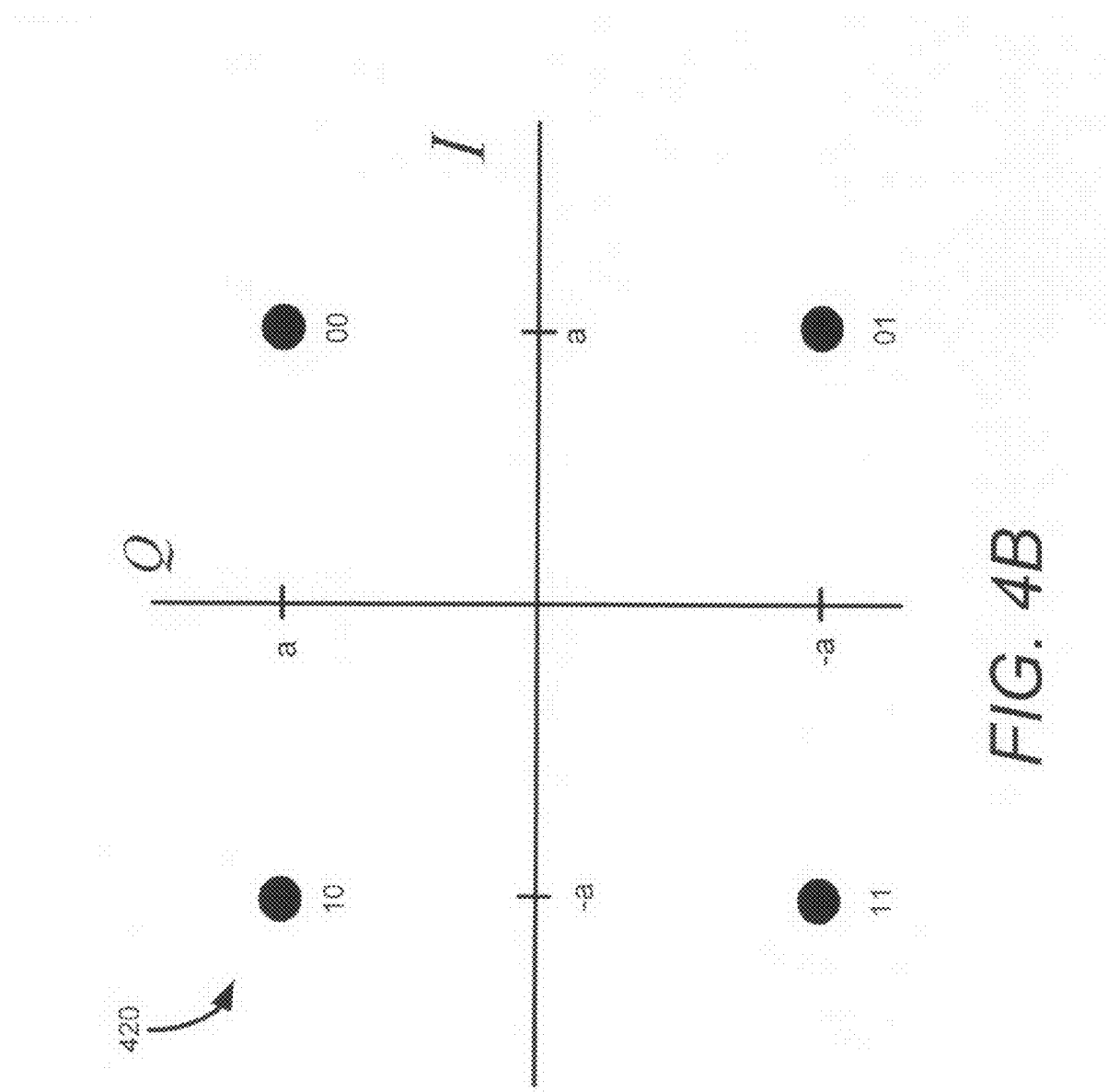
FIG. 4B illustrates the coded 4-QAM coded building block constellation.
Figure 4C:
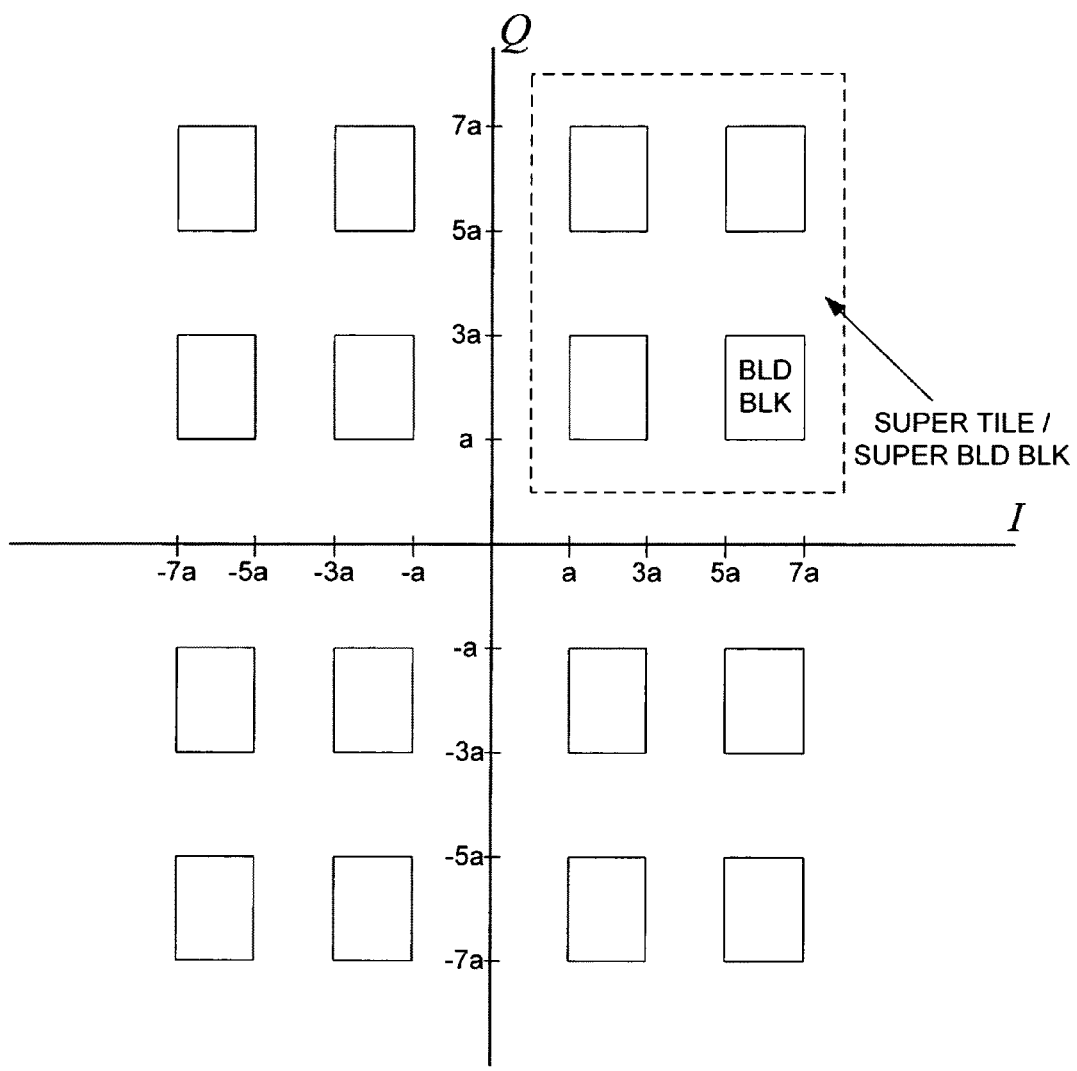
FIG. 4C illustrates a 3-level MLC scheme that uses a 64-QAM constellation that employs sixteen 4-point building blocks.

Most of the development herein uses the above MLC encoded constellation that uses the 16-QAM constellation of FIG. 4A. However, using the building block approach, these codes can be easily extended to larger constellations. A 3-level MLC scheme that uses a 64-QAM constellation that employs sixteen 4-point building blocks can be constructed as shown in FIG. 4C. An easier way to observe the construction of this code and the resulting constellation is to consider the constellation shown in FIG. 4A as a super building block and use four of them in the four quadrants the same way four building blocks of FIG. 4B were replicated and tiled to form the 16-QAM constellation of FIG. 4A. As two tiling coded bits were used to identify the quadrant in FIG. 4A, two $3^{rd}$ level bits, referred to as "super tiling bits," can be used to identify each of the 16-QAM super building blocks.

It is noticed that once the BC and TC bits are identified by their respective decoders, the MSED between the super tiling bits is $(8a)^2=64a^2>40a^2$. Therefore no additional coding is needed at the $3^{rd}$ level since the targeted minimum squared distance of the entire MLC is $40a^2$. The MLC-coded scheme of FIG. 4C transmits 4.6 bits (2.6 bits from the super building block and 2 bits from the super tiling bits) during every interval. Similarly, a 3-level MLC can be constructed by using 4 uncoded bits (2 on I and 2 on Q) at the $3^{rd}$ level. This requires the use of 16 super building blocks, forming a 256 QAM constellation. This scheme transmits 6.6 bits/interval and has a path multiplication factor $(15/8)^{10}=537.05$. The path multiplication factor is described in further detail below.

It should also be noted that the present invention can be applied to smaller signal constellations such as QPSK, 8-PSK, and other constellations. In such cases the TC and the BC may have smaller numbers of bits, e.g., the BC and TC could have one bit each, or the BC could have two bits and the TC could have one bit, or the BC could have one bit and the TC could have two bits. Similarly, the TC and BC could be substituted for constituent codes CC1 and CC2 for use in alternative serial or parallel concatenated code embodiments.

III. Multi Stage Decoding and Multistage Decoding Enhancements

In this section, MSD is considered with the above exemplary MLC scheme. The decoding procedure, simulated performance results, and observations related to MSD that are relevant to the present invention are discussed. Some inventive enhancements to the basic MSD approach that are used by the present invention are provided, to include a specific interleaving architecture and a stopping condition for iterations.

A. Decoding Procedure

In multi-stage decoding, a received signal, $r=(r_1, r_2, \ldots r_k, \ldots)$ is first processed by a lower level decoder to decode the BC. When the BC is the trellis code of FIG. 2A and is mapped as per FIG. 5 (with or without interleavers), the BC decoder can be implemented as a Viterbi decoder. In the BC Viterbi decoder, branch metrics are computed that correspond to each of the four possible BC coded bit combinations ij∈{00, 01, 10, 11}. However, since the BC's 4-QAM constellation of FIG. 4B is tiled onto the 16-QAM constellation of FIG. 4A, the branch metric for any BC coded bit combination is calculated by determining the minimum squared distance between the received signal and each tiled replica of each constellation point having that particular BC coded bit combination. For example, consider FIG. 4A and note that the branch metric for the BC coded bit combination (1,1) would be calculated during any $k^{th}$ interval as:

$$BM_{BC,11}(k)=\text{Min}\{|r_k-(a+ja)|^2, |r_k-(a-j3a)|^2, |r_k-(-3a+ja)|^2, |r_k-(-3a-j3a)|^2\} \quad (3)$$

More generally, building-block coded bit combination (ij) maps to a point $P_{ij}$ in FIG. 4B. The addition of the TC bits causes $P_{ij}$ to be translated onto a point in one of the four tiles of FIG. 4A, and this point is denoted $P_{ij,TC}$, where TC∈{T0, . . . T3}. Since the TC coded bits are unknown to the MSD during BC decoding, the branch metric for the BC coded bit combination (ij) is selected/computed according to:

$$BM_{BC,P_{ij}}(k)=\min\{|r_k-P_{ij,T0}|^2, |r_k-P_{ij,T1}|^2, |r_k-P_{ij,T2}|^2, |r_k-P_{ij,T3}|^2\}. \quad (4)$$

After decoding the BC, the BC's decoded bits are used by the TC decoder to decode the TC bits. In effect, once the point within the tile is decided by the BC decoder, the TC decoder only needs to decide which tile is most likely, given that the decoded BC point $P_{ij}$ was sent. Once the point $P_{ij}$ within a tile is known, the 16-QAM constellation of FIG. 4A reduces to a 4-QAM sub-constellation made up of four $P_{ij}$ points one from each tile in FIG. 4A. This can be viewed as the 4-QAM tiling constellation, similar to FIG. 4B, but with a raw uncoded distance of D=4a between tiling points. The TC decoder's branch metrics are calculated individually for the I and Q channels by projecting this 4-QAM sub-constellation onto the I and Q axes. For example, consider FIG. 4A and note that if the BC decoded bits during the $k^{th}$ interval are (11), the 4-ary sub-constellation points are at: (a,a), (−3a,a), (a,−3a) and (−3a,−3a), and the branch metrics used by TC decoder on the I-channel corresponding to the TC coded bits 1 and 0 can thus be calculated as:

$$BM_{TC,1}(k)=[Re(r_k)-a]^2; BM_{TC,0}(k)=[Re(r_k)+3a]^2. \quad (5)$$

More generally, consider FIG. 4A and note that the branch metrics for the I-channel's TC coded bits, given that the BC decoded bits are ij can be written:

$$BM_{TC,1}^{(I)}(k)=[Re(r_k)-Re(P_{ij,T0})]^2; BM_{TC,0}^{(I)}(k)=[Re(r_k)-Re(P_{ij,T2})]^2; \quad (6)$$

and the branch metrics for the Q-channel's TC coded bits, given that the BC decoded bits are ij can be written:

$$BM_{TC,1}^{(Q)}(k)=[Re(r_k)-Im(P_{ij,T0})]^2; BM_{TC,0}^{(Q)}(t)=[Re(r_k)-Im(P_{ij,T1})]^2. \quad (7)$$

To decode larger constellations, the branch metrics (6)-(7) will involve minimizations similar to (3)-(4) to take into account all additional replicas of the BC decision point, $P_{ij}$, located in the additional tiles.

B. Path Multiplicity

When four different tiles are used as shown in FIG. 4A, the path multiplicity of the BC, which is denoted by $A_d$ in isolation, is increased to $\alpha_{BC}A_d$ where $\alpha_{BC}$ is the path multiplicity multiplication factor (PMMF). The value of $\alpha_{BC}$ can be found by considering the effects of neighboring tiles. For example, considering all tiles, if the coded BC combination "11" is transmitted from the tile $T_0$, there are 4 constellation points corresponding to BC coded combination "00" all at a squared Euclidean distance of $8a^2$ indicating a multiplying factor of 4 during that interval. Similarly, there are 2 constellation points corresponding to each of the BC coded sequences "01" and "10" at squared distance $4a^2$. However, the number of these combinations varies among the constellation points. An average multiplying factor during a single interval can be found by averaging over the constellation points. By averaging over the constellation points in FIG. 4A, it can be found that the average number of neighbors with squared Euclidean distance $8a^2$ or Hamming distance 2 is $(9/4)=(3/2)^2$, and the average number of neighbors with squared Euclidean distance $4a^2$ or Hamming distance 1 is $(3/2)$. Since the minimum Hamming distance of the BC is 10, the PMMF $\alpha_{BC}=(3/2)^{10}=57.67$.

In general, the PMMF depends on two factors; (i) on the minimum Hamming distance of the code (ii) average multiplication factor per coded bit during a single interval which is determined by the signal constellation and mapping policy. The value of the PMMF then equals to the average multiplying factor of a coded bit raised to the power of the minimum Hamming distance of the code. Since a powerful code with a high minimum Hamming distance is usually used at the first level of a multi-level code, the PMMF of the first level can be very high, thereby degrading the performance at the first level that can penetrate into higher levels. Hence, increased path multiplicity at lower levels poses a problem for MLC codes.

The minimization taken in (4) over the tiles indicates that all tiles are weighted evenly, or in other words, it is assumed that all tiles have the same probability of being selected for transmission. This is indeed the best choice of probabilities when decoding the BC without any knowledge of the tiles. Note that, due to the minimization taken over the tiles during the calculation of the branch metrics (4), when the BC decoder decodes the BC sequence, it inherently assumes a tile to calculate its branch metrics (4) during every interval along the BC decoded path. Hence, when the BC decoder makes its decision on the BC sequence, it also inherently assumes a TC sequence via the minimization operation in the branch metrics (4) used for the BC decoding. However, this TC sequence inherently assumed by the BC decoder is in no way restricted to be a valid TC sequence according to the tile code. When this assumed TC sequence is not a valid sequence according to the TC code, the branch metrics used by the BC decoder are clearly incorrect and can lead to errors in the BC decoded sequence. However, once the BC decoded sequence is passed to the TC decoder, the final TC decoded sequence will necessarily be a valid TC sequence. Yet, the decoded TC sequence may or may not be the same TC sequence inherently assumed by the BC decoder via the minimizations in (4). If the TC sequence assumed by the BC decoder is invalid, the TC decoded sequence from the TC decoder will necessarily be different from the TC sequence assumed by the BC decoder.

It is further observed that if the TC sequence were available at the time of the BC decoding, the branch metrics of the BC decoder could have been calculated by making tile assumptions according to the known TC sequence instead of inherently assuming tiles according to the minimization as in (4). This suggests iterating the MSD algorithm instead of using a single run of MSD. During iterations, the BC decoder can take the outputs of the tiling decoder during every interval thereby removing the multiplicity of the tiles that increases the value of PMMF. However, the decisions made by the TC decoders may not be correct. Hence, it may be necessary to run several iteration of MSD to obtain reliable decisions as it is done in and as employed in the decoder algorithms described in later sections.

C. Observations on the Hybrid Trellis

In order to construct a good decoding technique with iterations, it is helpful to view the scheme in terms of its hybrid trellis, even though direct ML decoding of the hybrid trellis is too costly due to the very high number of states. For example, the hybrid trellis of the above scheme described in section II consists of $2^{14}$ states (64 from the BC and 16 states from each of the two TC) without interleavers. However, it is noticed that each path on the hybrid trellis comprises respective paths on each of the TC trellises and on the BC trellis. Hence, while decoding the BC, if either or both of the two tile sequences inherently assumed via the minimization in the BC's branch metrics (4) do not correspond to valid TC sequences on the TC trellises, the BC decoded sequence in combination with the inherently assumed TC sequences would not represent a path on the hybrid trellis.

While decoding the BC, when the metrics are calculated based on a valid TC sequence, the resulting BC decoded sequence and the TC sequence used in the BC metric calculations represent a first path on the hybrid trellis. Similarly, while decoding the TC, if the branch metrics are calculated corresponding to a valid BC sequence (it is noted that all BC sequences used by the TC are valid), the resulting TC decoded sequence along with the BC sequence used for metric calculations by the TC decoder represents a second path on the hybrid trellis. In order for both of these first and second hybrid trellis paths to represent the unique transmitted path on the hybrid trellis, they must be the same. That is, a necessary condition for a hybrid trellis path (BC, TC) to represent the unique transmitted signal is that the TC sequence inherently assumed during BC decoding to compute a BC decoded sequence must be the same as the TC decoded sequence computed using this BC decoded sequence in the TC branch metrics. A hybrid trellis path that meets this condition is called a valid path herein. If not, the resulting sequences cannot represent a unique transmitted sequence, and hence, the resulting BC and TC sequences in such cases are referred to as invalid paths in this patent application, and this observation is used in the development of the IHID and LV-IHID algorithms. This implies that if one is running iterations, where TC sequences are explicitly fed back to the BC decoder, the iterations should be run until a valid path is reached.

The present invention makes use of this observation to identify a set of stopping conditions that allow iterations to be stopped at the earliest possible time, i.e., as soon as the necessary condition is first met. That is, in the most general form of embodiment, the stopping condition is to stop iterations upon determination that a valid path has been reached. Some embodiments can stop after the necessary condition is first met, but preferred embodiments stop iterations at the earliest possible time, as soon as a stopping sub-condition is first met. That is, iterations can be stopped as soon as the TC sequence inherently assumed or otherwise used during BC decoding to compute a BC decoded sequence is the same as the TC decoded sequence computed using this BC decoded sequence to compute and/or select the TC branch metrics. Or, the iterations can be stopped as soon as the BC sequence used to compute a new TC sequence is the same as the BC computed using the new TC sequence. This is discussed in further detail in connection with the IHID algorithm below.

D. Error Propagation

When the component codes are trellis based, errors occur in a bursty manner. Hence, when lower level decoded bits with errors are passed on to higher levels, these error bits can have a significant impact within short sections of the higher-level trellises, leading to error propagation. To minimize this effect, interleaving between different MLC levels has been suggested in the prior art. In order to spread out errors of the BC with respect to the TC sequence, a rectangular interleaver can be used. In accordance with an aspect of the present invention, the dimensions of the interleaver are preferably determined based the receiver path memory lengths of the decoders; $\lambda_{BC}$ of the BC decoder and $\lambda_{TC}$ the tiling decoder. Noticing that errors of a single merging event with minimum distance occur in a burst within a length equal to the receiver path memory length, a rectangular interleaver on coded bits with dimensions $$\left\lceil \frac{(\lambda_{BC}+1)}{2} \right\rceil$$

by $\lambda_{TC}$ is preferably used to spread out errors, where $\lceil\ \rceil$ denotes the ceiling function. Using the exemplary code of Section II, it was numerically found that, in this example, $\lambda A_{BC}=52$ and $\lambda_{TC}=20$.

Figure 5:
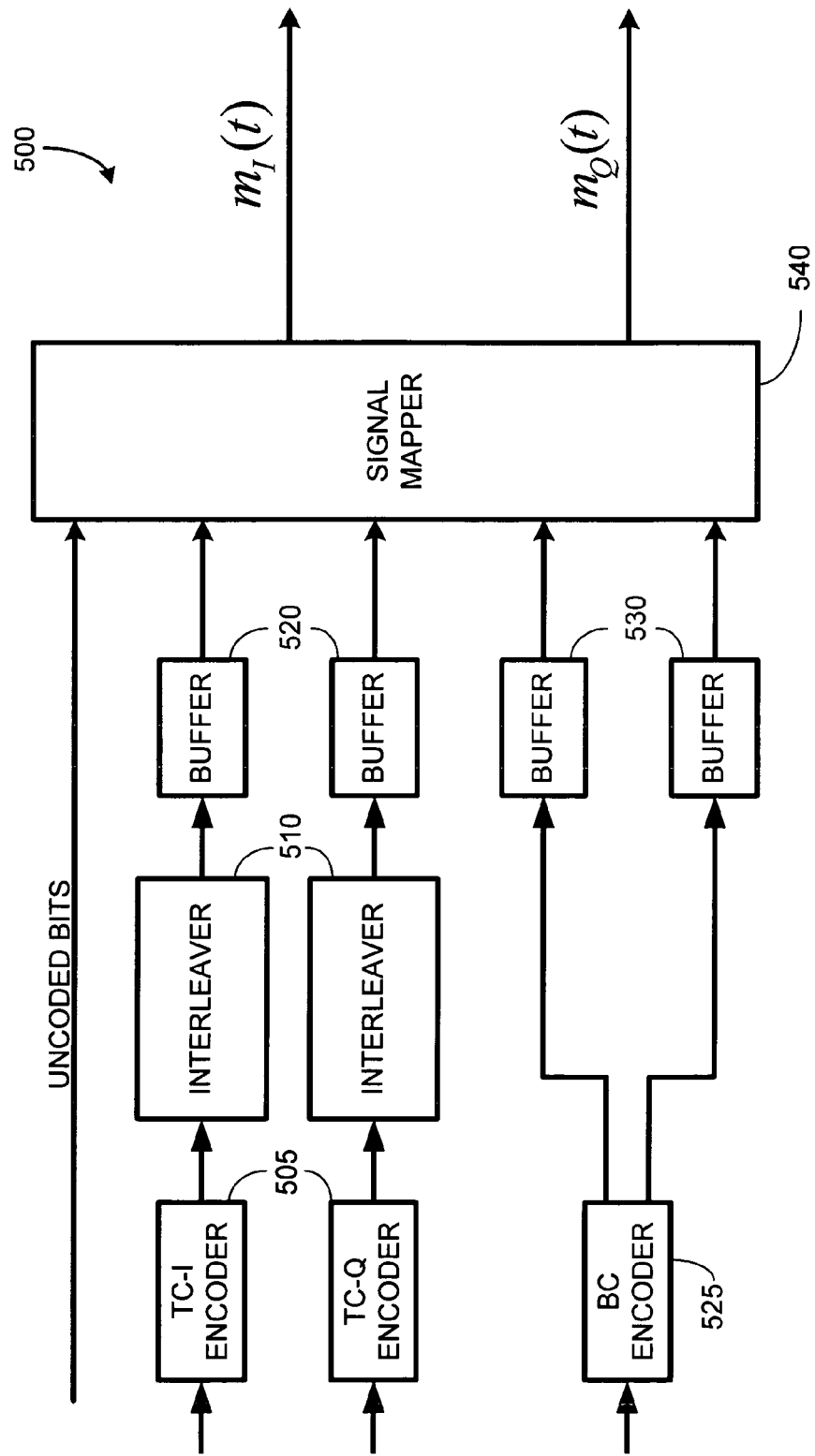
FIG. 5 is a block diagram illustrating a multilevel encoder as used in an exemplary embodiment of the present invention.

FIG. 5 shows an exemplary implementation of an MLC signal mapper 500 configured in accordance with an embodiment of the present invention. A single BC encoder 525 provides two BC encoded bits, and a pair of I/Q TC encoders 505 provide a pair of TC encoded bits. The TC-encoded bits passed to respective I and Q interleavers 510. These are preferably implemented as rectangular interleavers with the dimensions described above. Buffers 520, 530 are used to store a frame of bits to allow the interleaving to occur on a frame level given a streaming bit source. The two BC bits and the two TC bits are then mapped to a 16-QAM signal constellation point via the signal mapper 540. It is recognized that other types of signal constellations such as 16-PSK (phase shift keyed, an example of a constant-modulus/constant-envelope phase shift keyed modulation type) or other types of constellations could be used.

Figure 6:
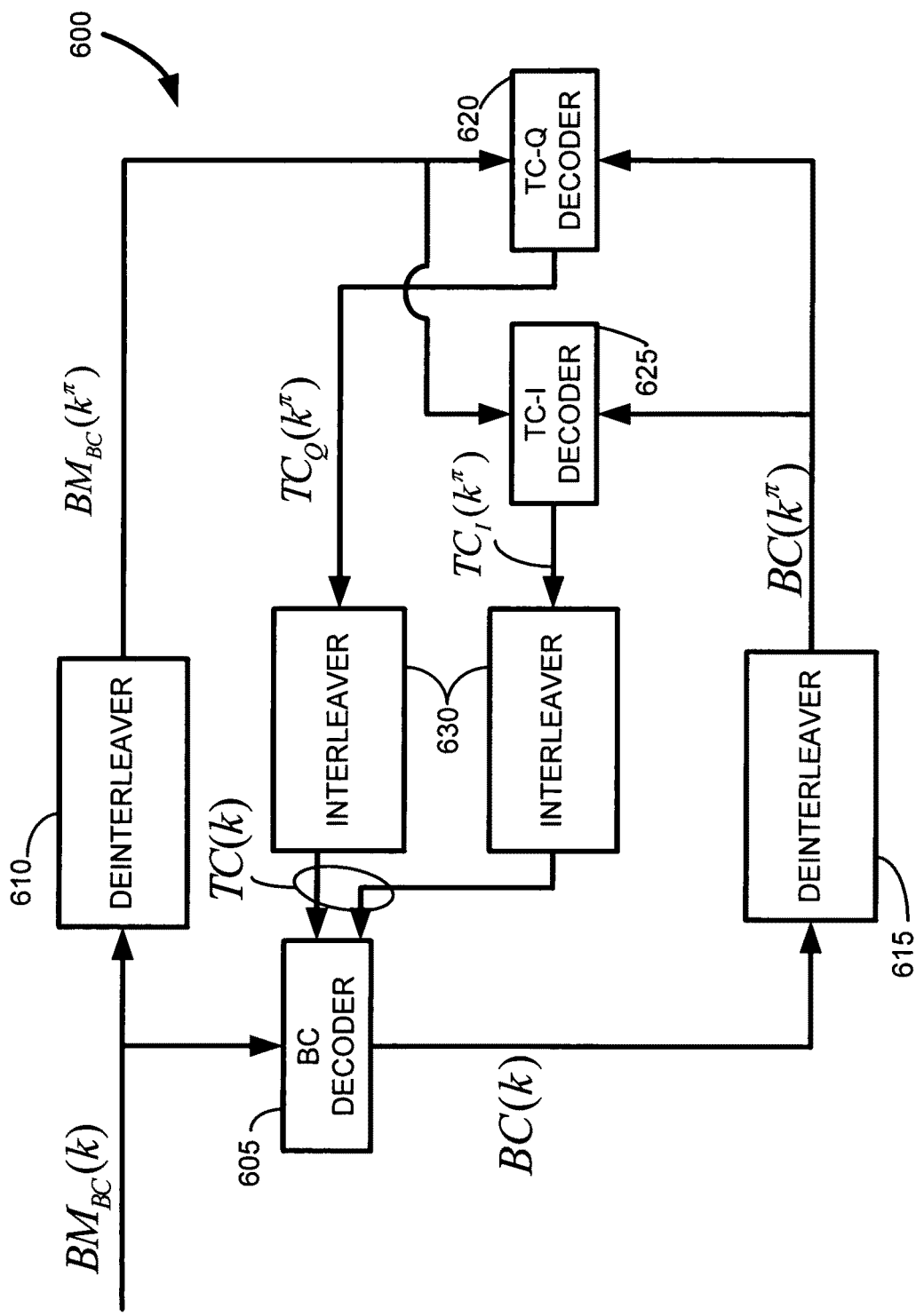
FIG. 6 is a block diagram illustrating deinterleaving and reinterleaving logic among coding levels in the decoders of the present invention.

FIG. 6 shows how deinterleaving and reinterleaving is performed between levels in an MSD decoder and/or an iterative decoder such as the IHID decoder, where each iteration involves an MSD decoding operation. The BC branch metrics are calculated and fed to the BC decoder 605 and to the deinterleaver 610. The BC branch metrics can stored as raw distances on the I and Q channels in addition to the sums of these distances used in BC decoding as discussed in connection with FIG. 7. The BC branch metrics are used in the BC decoder 605 to compute a first BC decoded sequence. The first BC decoded sequence is deinterleaved in the deinterleaver 615 and is used to select among the distances during each deinterleaved signaling interval in the TC decoders to identify the branch metrics to be used in each of the I and Q TC decoders 620, 625. If iterations are being used, as discussed in connection with FIGS. 7-10, the TC decoder outputs are reinterleaved in the interleavers 630 before being used in a second BC decoding. The BC decoder 605 uses the interleaved TC sequence for tile selection in the BC branch metric calculation as per equation (8) as described in Section IV.

In an alternative type of embodiment, assuming the exemplary code with two BC bits and two TC bits, a rectangular interleaver with a 4-bit word width is used. In this example, each 4-bit entry of this interleaver contains two BC bits and two TC bits (one from each of the I and Q TCs). Transmitted symbols are formed by feeding BC bits along columns and feeding TC bits along rows. This provides the interleaver function as used in the systems shown in FIGS. 5a and 6, but with an alternative interleaver structure. When such an embodiment is used, the interleavers 510, 630 and the deinterleavers 610, 615 can be implemented with this alternative interleaver structure.

On the hybrid trellis, there are paths that are separated by Euclidean distance $40a^2$ created by the BC that have the same TC sequence, and paths separated by $48a^2$ created by the TC that have the same BC sequence. However, with the insertion of the interleaver, paths that are separated by both TC and BC bits have significantly higher distances. Due to the interleaver, a minimum distance error event of the TC introduces three TC bit errors which are spread over three different path memory lengths of the BC code. Hence, a single TC bit error that falls between two paths of a merging event of the BC only, will again take off at least twice contributing at least $16(a^2)(2)=32a^2$ to the Euclidean distance, after the BC bits have merged. Hence, any incorrect TC sequence coupled with a BC sequence will have a much higher separation from the correct path.

On the hybrid trellis, the iterations along with interleaving remove any ambiguity in selecting the tile for the calculation of the branch metrics for the BC. Hence, they eliminate the increase in the path multiplicity and force PMMF to be 1. If iterations are performed without interleaving, the BC error segments are likely to coincide with TC error segments. Without interleaving, it is noticed on the hybrid trellis that, if the incorrect paths that correspond to BC errors are such that they can come from different tiles that satisfy the TC, there will still be path multiplication even with iterations. The component codes may be selected to prevent all error events of the BC that can come from different tiles to be not valid TC sequences. If that is possible, the PMMF can be made 1 without interleaving. However, without interleaving, due to the overlapping segments of errors of the two codes, there will always be many other merging events on the hybrid trellis with distances slightly higher than the overall minimum distance, and these merging events will degrade performance. Hence, the best approach to develop efficient MLC schemes that eliminates the path multiplicity multiplication, or forces PMMF to be PMMF=1, is to jointly use iterations with interleaving.

IV. IHID Decoding Algorithm

An improved hard iterative decoding (IHID) algorithm is developed herein to improve the performance of the above class of MLC schemes over the prior art hard iterative decoders. First, the MSD is modified by using interleaving as described in section III-D. The IHID algorithm uses iterations to search for a valid path on the hybrid trellis as defined in section III-C. This provides an efficient way to terminate the hard iteration process. The IHID algorithm can also be applied to decode other types of coded sequences beside MLCs, for example, serial and parallel concatenated codes, as previously discussed.

Figure 7:
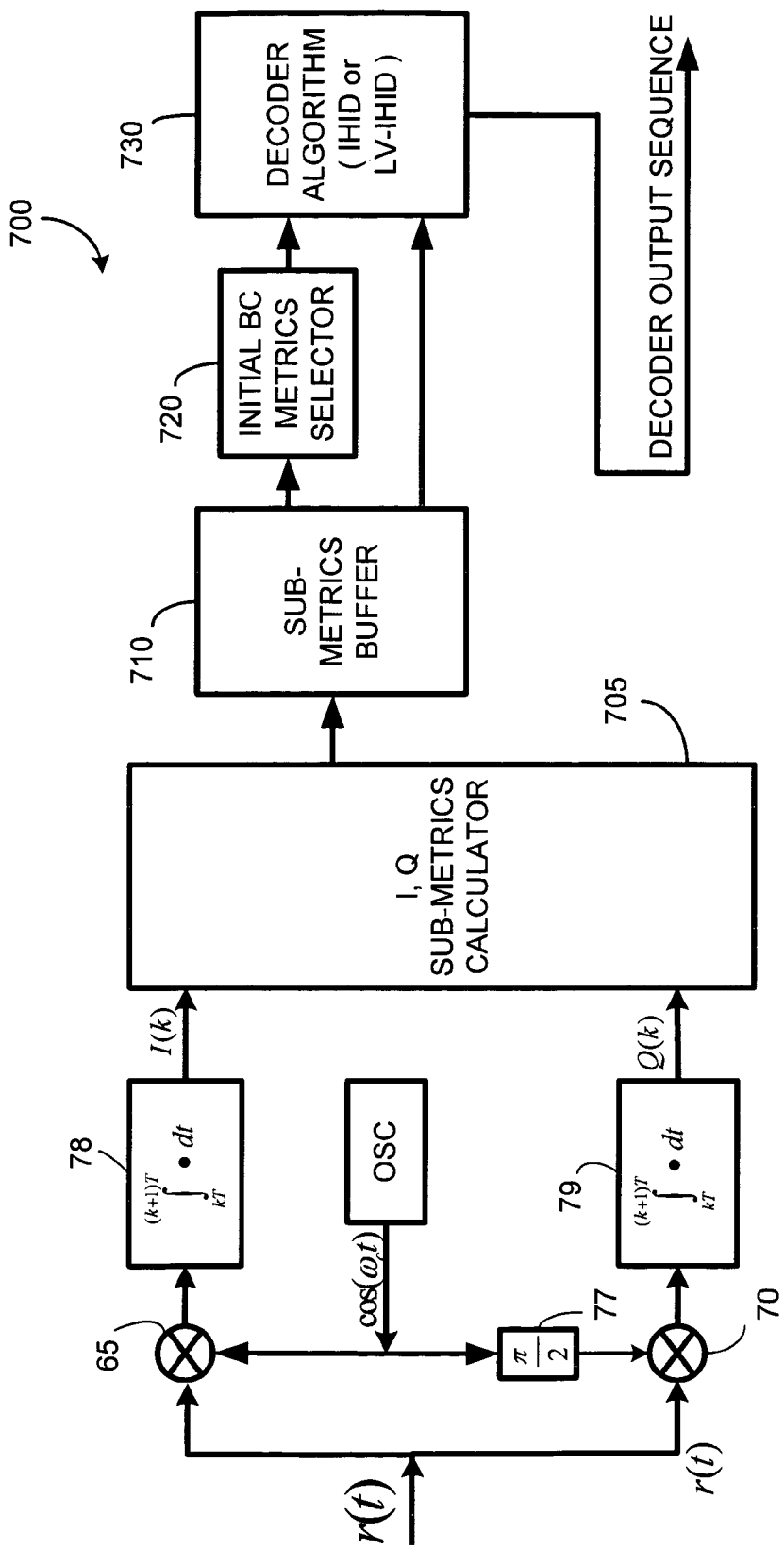
FIG. 7 is a block diagram illustrating an exemplary embodiment of improved hard iterative decoders in accordance with the present invention.

FIG. 7 is a block diagram that illustrates a preferred receiver structure for use with the present invention. A communication signal, r(t), is I/Q demodulated and filtered using an integrator structure 78, 79, an integrate-and-dump matched filter, a low pass filter, an equalizer, or a similar structure. This produces a sampled signal, r(k)=I(k)+jQ(k). The sampled signal, r(k), is preferably sent to an I, Q sub-metrics calculator 705 that computes, during each signaling interval, a respective set of I and Q distances between the I and Q components of the sampled signal and each of the constellation points shown in the FIG. 4A, for example. These distances are stored in a sub-metrics buffer 710 as they will be reused multiple times to compute various branch metrics (in 730). In 720, equation (4) or some other equation is used to compute or select an initial set of BC metrics. The initial set of BC branch metrics is used in a decoder algorithm 730, such as the IHID algorithm or the LV-IHID algorithm described in Section V. The various sets of distances stored in the distances buffer 710 is also made available to the block 730. The block 730 implements an iterative decoding algorithm to produce a final-converged decoder output sequence.

Figure 8:
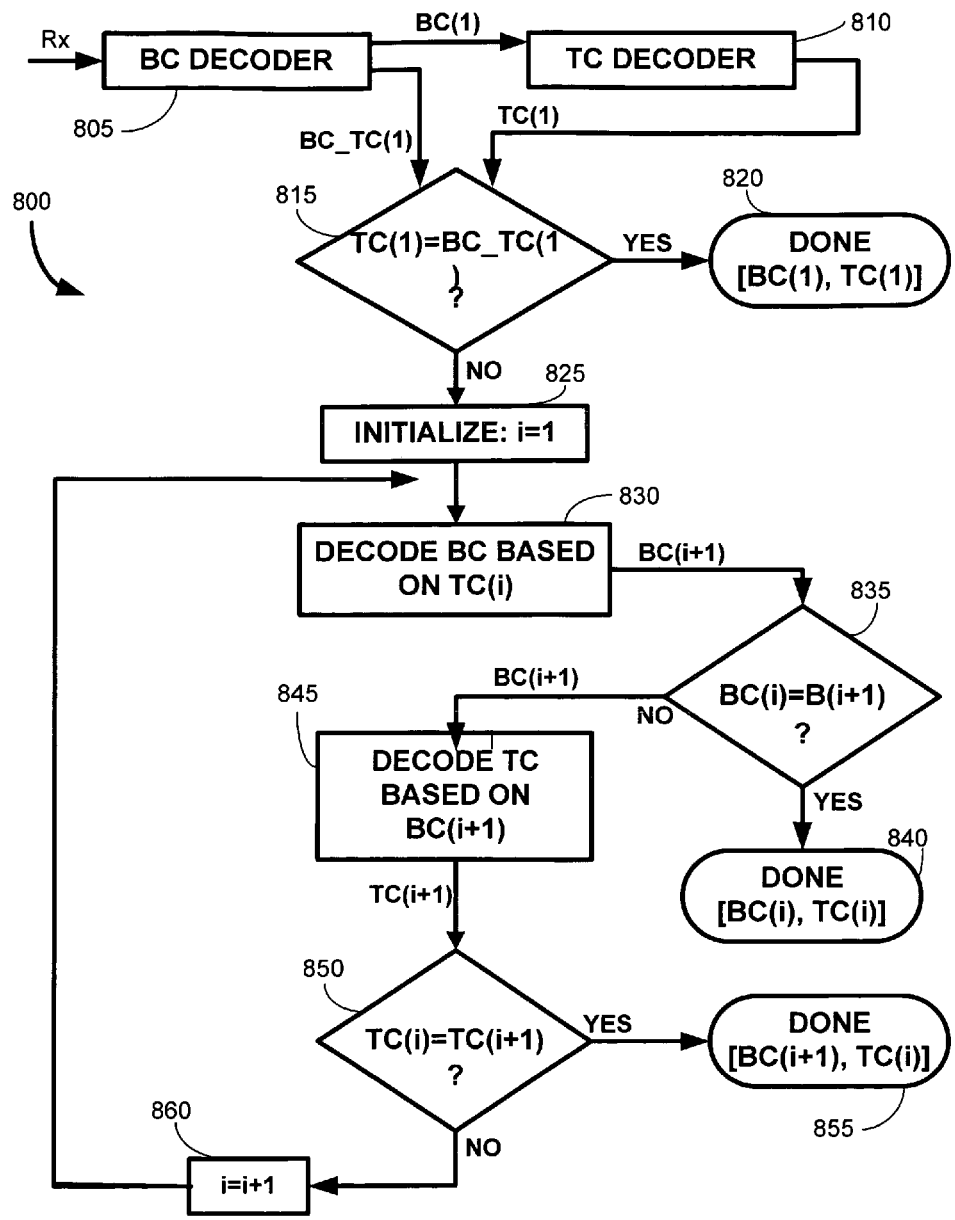
FIG. 8. is a flow chart illustrating a method of processing for improved hard iterative decoding of MLCs

FIG. 8 shows a flow chart of the IHID algorithm. First the BC is decoded and the corresponding tiling sequence that is inherently used by the BC for metric calculation is stored. The BC decoded sequence and the inherently assumed tiling sequence are denoted by BC(1) and BC_TC(1) respectively. Then the TC decoders decode the TC bits using the BC decoded bits and reconstruct the tiling sequence which is denoted by TC(1). If this reconstructed tiling sequence matches with the tiling sequence used by the BC, i.e. if TC(1)=BC_TC(1), then a valid path on the hybrid trellis has been found. At that point, the decoder stops and accepts the BC and TC decoded sequences as the estimated coded sequences. If there is no match, i.e., TC(1)≠BC_TC(1), the TC(1) sequence is passed down to the BC decoder and the BC decoder is re-run, this time using a modified branch metric calculation that assumes that the TC(1) sequence is the correct tiling sequence. For example, during the $k^{th}$ interval, if the TC(1) sequence results in the tile $T_0$ of FIG. 4A, the branch metric of the BC corresponding to the bit combination "11" is calculated by modifying (3) as $$BM_{BC,11}(k)=|r_k-(a+ja)|^2, \qquad (9)$$

or, more generally, if the $k^{th}$ element of the TC(1) sequence results in the tile Tx∈{T0, . . . T3}, then the BC branch metric can be computed according to:

$$BM_{BC}(k,Tx)=|r_k-P_{ij,Tx}|^2. \qquad (10)$$

If the second BC decoded sequence is BC(2), and if BC(1)=BC(2), the decoder stops and accepts the decoded sequences BC(1)=BC(2) and TC(1) as the decoded sequences. The reason for stopping when BC(1)=BC(2) is because, even if BC(2) were to be passed up to the TC decoders, the TC decoders would necessarily generate TC(2)=TC(1). If BC(2)≠BC(1), BC(2) is passed on to the TC decoders to calculate the second tiling sequence TC(2). If TC(2)=TC(1), the decoder stops and accepts the decoded sequences BC(2) and TC(1)=TC(2). If not, TC(2) is passed down to the BC decoder and the process repeats until there is a match. The IHID algorithm thereby iterates until it finds a valid path as defined in section III.C. A match during iterations guarantees a valid path on the hybrid trellis. It is also assumed that proper de-interleaving and re-interleaving is performed (using FIGS. 5/6 or the word based class of interleavers described above) while passing decoded sequences from one decoder to the other to offset the effect of interleaving at the transmitter.

FIGS. 5-8 illustrate one embodiment of a method or apparatus for decoding a multi-level coded (MLC) signal. For example, the MLC signal can be encoded in accordance with Section II and FIG. 5 using the MLC-encoded 16-QAM constellation of FIG. 4A. The communication signal, r(t), is received and sampled, so that for each of a plurality of signaling intervals, respective set of distances can be computed in block 705 between a digitized sample of the communication signal and each member of a set of MLC-encoded signal constellation points such as the sixteen points shown in FIG. 4A. In the exemplary embodiment, the I and Q component distances are summed to compute a respective set of BC branch metrics. This respective set of BC branch metrics includes one BC branch metric per constellation point of FIG. 4A. An equation such as equation (4) is then used to select a first respective subset of BC branch metrics. The first respective subset includes one BC branch metric for each set of constellation points that have identical BC bit encodings. For example, in FIG. 4A, see the four constellation points who's 4-bit encodings end in "11."

The first respective subsets computed using equation (4) for each BC bit pair are then used to compute a first BC decoded sequence in a decoder 605 which can be implemented as a Viterbi decoder. Each time the decoder 605 or the decoders 620, 625 are used to generate an output sequence, this is denoted as a "run" of the decoder. Also, an inherently assumed TC decoded sequence is preferably identified by identifying the sequence of tiles that caused equation (4) to be minimized in each of the corresponding signaling intervals.

The first BC decoded sequence is used to identify a sequence of first respective subsets of TC branch metrics using the respective sets of distances stored in 710. For example, equations (6)-(7) are used for this purpose. For larger constellations, a minimization similar to (3)-(4) may also be used. If a super tiling code is in use, STC decoded bits can be also be used to make tile selections. The sequence of first respective subsets of TC branch metrics are then used to compute a first TC decoded sequence using, for example, the TC decoders 620, 625. Interleaving/deinterleaving as per FIG. 6 is also preferably performed.

If the inherently assumed TC decoded sequence is equal to the first TC decoded sequence (815), an MLC output sequence is provided that has a BC output sequence that is substantially equal to the first BC decoded sequence and a TC output sequence that is substantially equal to the first TC decoded sequence (820). Throughout this application, "substantially equal" can mean exactly equal of differing in a very few number of bits, or differing by a very small distance, or the like. If the inherently assumed TC decoded sequence is not equal to the first TC decoded sequence (815), then the respective sets of distances and the first TC decoded sequence are used (830) to compute a second BC decoded sequence. If the second BC decoded sequence is equal to the first BC decoded sequence (835), the MLC output sequence is provided where the BC output sequence is substantially equal to the second BC decoded sequence and the TC output sequence is substantially equal to the first TC decoded sequence (840).

If the second BC decoded sequence is not equal to the first BC decoded sequence (835), then the respective sets of distances and the second BC decoded sequence are used to compute a second TC decoded sequence (845). If the second TC decoded sequence is equal to the first TC decoded sequence (850), then the MLC output sequence is provided where the BC output sequence is substantially equal to the second BC decoded sequence and the TC output sequence is substantially equal to the second TC decoded sequence (855).

It can be noted that the multi-level encoded signal $r(t)=m_I(t)+jm_Q(t)$ can be designed in accordance with set partitioning. In such cases the BC generally corresponds to a set of coded bits that identify subsets of a set partition. In alternative embodiments, the first BC decoded sequence includes an in-phase component sequence and a quadrature phase component sequence that are individually decoded using respective in-phase and quadrature-phase sequence decoders, similar to the way tile encoding and decoding are performed in FIGS. 5 and 6. In such cases, the computing of the first set of BC branch metrics comprises identifying a corresponding distance of the set of distances.

In some embodiments, the coded signal is a multilevel coded signal, the CC1 is a lower level code, and CC2 is an upper level code. In some such cases, the lower level code will also be a building-block code (BC), and the upper level code will be a tiling code (TC). Thus the decoder output sequence would be a multilevel decoded sequence that includes a BC decoded sequence and a TC decoded sequence. In some preferred embodiments, the BC and the TC involve convolutional codes, and the BC decoded sequence and the TC decoded sequence are decoded via respective BC and TC Viterbi decoders. As discussed above, the TC Viterbi decoder can be configured to include an in-phase TC Viterbi decoder and a quadrature-phase TC Viterbi decoder. In such embodiments, an "iteration thread" would typically correspond to a series of iterative multistage decoding (MSD) runs, each MSD run would use a previously decoded BC sequence to assist in computing branch metrics for use in current TC decoder run, and at least one of the MSD runs would use a previously decoded TC sequence to assist in computing branch metrics for use in current BC decoder run.

Figure 11:
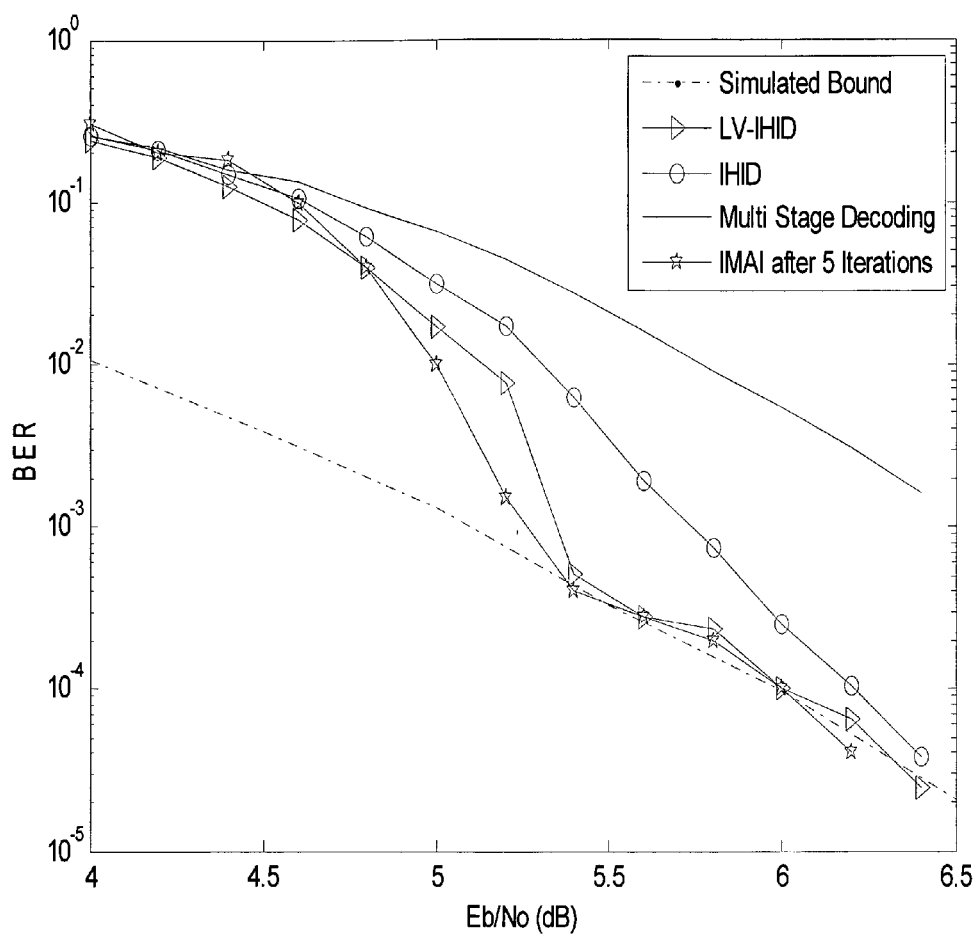
FIG. 11 is a plot showing various performance curves, to include a lower bound error curve, and error curves for IHID, LV-HID, MSD, and soft iterative decoding.

FIG. 11 shows the simulated error rate variations of the IHID algorithm using the exemplary modulation and coding scheme discussed in connection with FIGS. 2-4. Also shown for this same MLC scheme are the error rate variations of a modified IHID algorithm which is referred to as LV-IHID and is described in section V, and that of soft iterative decoding for MLCs. For comparison, results with multi-stage decoding and a simulated asymptotic error rate variation of the code that approaches ML decoding are also presented. The asymptotic error rate variation has been found here by simulating the error rate variation of the BC when both tiling codes are known in advance to the BC decoder. In general, such a bound for a MLC can be obtained by simulating the error rate of the code that generates the minimum distance of the overall MLC assuming all other levels make correct decisions. It is seen that the performance with the IHID algorithm approaches the asymptotic lower bound when the SNR is about 6.4 dB. It is however noticed that at moderate values of SNR, there is a noticeable difference between the simulated error rates of IHID and the asymptotic bound. This indicates room for further improvement at moderate SNR values.

V. LV-IHID Algorithm

In this section, the list Viterbi IHID (LV-IHID) algorithm is described and alternative embodiments of it are discussed.

A. Description of the LV-IHID Algorithm

The LV-IHID algorithm improves upon the IHID algorithm by observing that the IHID's performance is limited by the starting BC sequence it initially selects with no knowledge of the tile code (using the branch metrics (5)). Like MSD, the IHID algorithm starts decoding the received signal with the assumption that all possible TC sequences are valid and equiprobable. This provides an initial estimate, BC(1), that serves as a starting point for the IHID's iterative search. As shown in FIG. 11, when the SNR is high enough, the valid path (as defined in section III-C) that is determined by the IHID algorithm is very likely to be the ML path. However, as the SNR gets lower, this path will less likely correspond to the ML path because the starting point, BC(1), will often be so far away from the BC of the desired ML solution that the IHID algorithm will converge to some other valid path. This motivates one to consider multiple candidate starting points and to use the IHID algorithm to identify several IHID-converged-to "termination points" that correspond to multiple candidate valid paths. Selecting the best of these multiple candidate valid paths would increase the chances of finding the global optimal ML sequence.

In order to make the selection among these candidate valid paths, the total metric on the hybrid trellis can be used. The total metric of the hybrid trellis path represented by the signal $s(BC_i, TC_j)$ that corresponds to a given BC sequence $BC_i$ and the TC sequence $TC_j$ can be calculated over a window of values of k as:

$$TM(i, j) = |r - s(BC_i, TC_j)|^2 = \sum_k |r_k - s(BC_{i,k}, TC_{j,k})|^2 \qquad (6)$$

where $s(BC_{i,k}, TC_{j,k})$ is the value of $s(BC_i, TC_j)$ during any $k^{th}$ interval. Note that once a valid TC coded sequence $TC_j$ is used in the BC decoder to find any BC decoded sequence $BC_i$ using Viterbi decoding, the final metric on the BC decoder will already be equal to $TM(i,j)$ in (6), so that (6) need not be computed explicitly.

Figure 9:
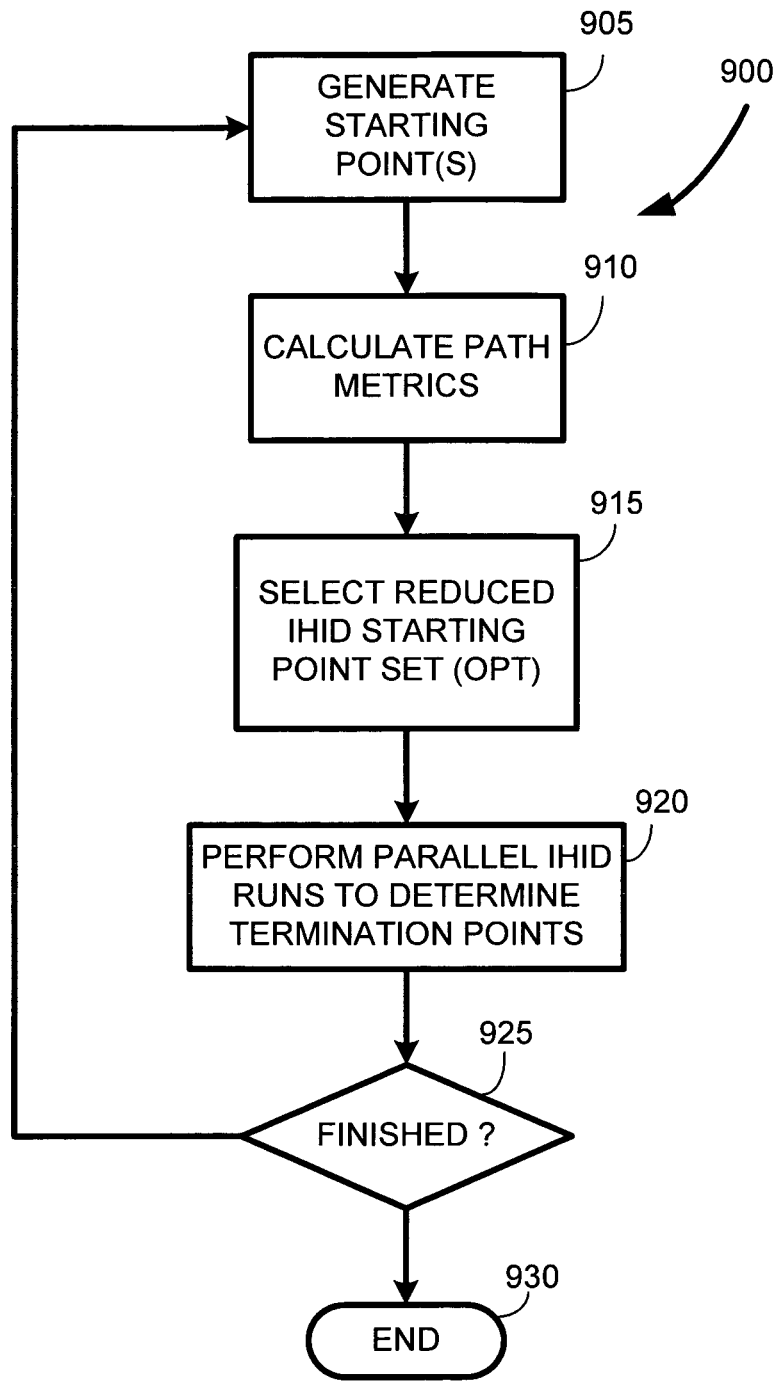
FIG. 9 is a flow chart illustrating a method of processing for improved hard iterative decoding of MLCs using multiple starting points.

FIG. 9 shows a flow chart of a method 900 that corresponds to genus of algorithms to which the LV-IHID algorithm belongs. In a first step 905, a set of starting points are generated. This can be done by decoding the received sequence r(k) in a variety of ways, for example by assuming the TC points are equiprobable, or using other TC probability assumptions, or making initial joint BC, TC estimations, using tentative tiling decoding, and the like. In a step 910, a set of path metrics are computed. These path metrics are often provided as a byproduct of the step 905. In an optional set 915, the set of starting points determined in step 905 is reduced to a smaller set. In a step 920 several different IHID runs are made, each starting at a respective starting point and terminating at a respective termination point. These can be run in parallel or sequentially, but are independent so can be viewed as being parallel IHID runs. At step 925 a termination criterion is evaluated to determine whether an acceptable solution has been found. If not, control loops back to step 905 where the termination points found in step 920 are used to improve the estimate of the set of starting points.

Figure 10:
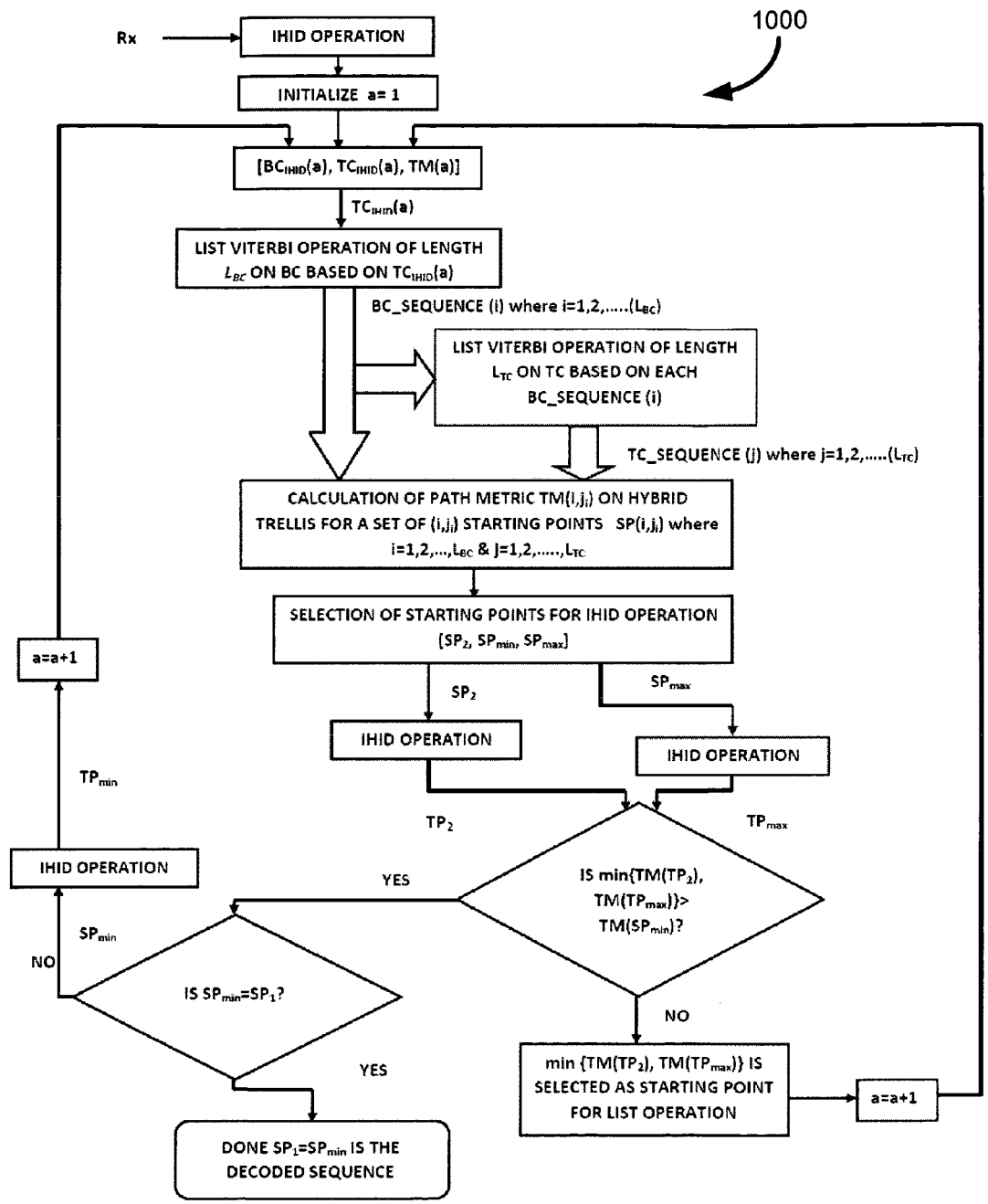
FIG. 10 is a flow chart illustrating a method of processing for improved hard iterative decoding of MLCs using the List Viterbi Decoding (LVD) algorithm to generate the multiple starting points.

FIG. 10 shows a flow chart of the list Viterbi IHID (LV-IHID) algorithm of the present invention. Different embodiments of the LV-IHID algorithm This is a special case of the method 900. The List Viterbi decoding (LVD) algorithm is used to create the multiple candidate starting points. The reason for running the LVD is to create a separation from the original starting point as the goal here is to search over several different valid paths. The LVD generates an ordered list containing a pre-selected number of probable paths, stating from the most probable path. In the flow chart, the IHID algorithm starts out by setting a loop counter set to $\alpha=1$. To start off the procedure, the IHID algorithm is run to convergence to identify a first valid path, denoted ($TC_{IHID}(1)$, $BC_{IHID}(1)$).

In order to create multiple starting points during each iteration of LV-IHID, starting with $\alpha=1$, a LVD is executed to generate an ordered list of BC sequences using $TC_{IHID}(a)$ in the BC's branch metrics similar to (3)-(4). Next, for each BC decoded sequence in the list, a corresponding LVD is executed to compute a respective list of TC decoded sequences. If the list lengths of the LVD decoders of the BC and TC decoders are $L_{BC}$ and $L_{TC}$ respectively, then at the end of the LVD decoding on the BC and TC, a set $\{SP(i,j_i)\}$ of starting points comprising BC and TC coded sequences, where, i=1, 2, ... $L_{BC}$ and $j_i$=1, 2, ... $L_{TC}$ are available. The IHID algorithm can be run for each of these starting points, $SP(i,j_i)$, to generate a respective termination point that corresponds to a valid path. Each such termination point will have an associated total metric, $TM(i,j_i)$.

A simple but somewhat costly approach would be to run the IHID algorithm on each of these $L=L_{BC}L_{TC}$ starting points to determine L IHID solutions, and to then use (6) to determine the solution with the lowest metric. It has been determined through simulations that the above approach gets to the right solution, but is overly burdensome in terms of complexity. This is because the IHID iterations starting from all of these starting points tend to cluster and converge to the same two or three solutions over and over again. Note that by the rank ordering of the LVD, the starting point $SP_1=(BC_1,TC_{1_1})$ corresponds to ($BC_{IHID}(a)$, $TC_{IHID}(a)$) during any $a^{th}$ iteration. This will often lead to the LV-IHID solution, because as the SNR increases, the IHID and LV-IHID solutions become the same. It was observed via simulations that fairly often, the next closest starting point, $SP_2=(BC_1,TC_{2_1})$ would often converge to the best solution among all available starting points. It was also found that three starting points that would typically lead to the three different converged IHID solutions were $SP_2$, $SP_{min}$, and $SP_{max}$, where $SP_{min}$ and $SP_{max}$ are the starting point with the minimum and maximum total metrics in (6) respectively. These observations were used to determine the loop-termination logic described below.

Referring back to FIG. 10, during any $a^{th}$ LV-IHID iteration, IHID iterations are carried out for $SP_2$ and $SP_{max}$ to determine corresponding IHID termination points, $TP_2$ and $TP_{max}$. Each of these correspond to respective valid paths with component BC and TC sequences. The loop termination logic below ends the search when the LVD fails to produce any candidates with lower metric than was available prior to calling the LVD.

1. If $\min\{TM(TP_2),TM(TP_{max})\} > TM(SP_{min})$ then
   (a) If $SP_{min}=SP_1$, then $SP_{min}$ is declared as the final decoded combination
   (b) If $SP_{min} \neq SP_1$, then IHID iterations are carried out for $SP_{min}$ to determine corresponding IHID termination point $TP_{min}$ and $TP_{min}$ is assigned to ($BC_{IHID}(a+1)$, $TC_{IHID}(a+1)$); next move to the $(a+1)^{th}$ iteration by initiating LVD algorithms starting from ($BC_{IHID}(a+1)$, $TC_{IHID}(a+1)$).
2. If $\min\{TM(TP_2),TM(TP_{max})\} < TM(SP_{min})$
   The BC and the TC sequences corresponding to the $\min\{TM(TP_2),TM(TP_{max})\}$ is assigned to ($BC_{IHID}(a+1)$, $TC_{IHID}(a+1)$) and move to the $(a+1)^{th}$ iteration.

FIG. 11 shows the performance of the LV-IHID algorithm along with that of the IHID algorithm when $L_{BC}=2$ and $L_{TC}=4$, using the MLC as discussed in connection with FIGS. 2-4. It is noticed that the LV-IHID algorithm performs better than the IHID algorithm at moderate SNR values. For comparison, the performance of soft decoding with the parallel implementation as discussed in is also plotted in FIG. 11. It was numerically found that the performance improvement with soft decoding does not change significantly after 5 iterations, and hence, 5 iterations have been used in the soft decoding simulations. It is seen from FIG. 11 that soft decoding reaches the ML bound around 5.2 dB, the LV-IHID algorithm reaches the bound around 5.4 dB while the IHID algorithm reaches the bound around 6.4 dB. Hence, it is seen that the LV-IHID algorithm performs close to soft decoding and it is, as expected, better than the IHID algorithm. Further, as discussed in Section VI, both the LV-IHID and IHID algorithms have an advantage over soft decoding in terms of computational complexity and computational delay.

B. Alternative Embodiments of the LV-IHID Algorithm

The LV-IHID algorithm can be implemented in various alternative ways to balance performance against computational complexity. Some of these alternative modifications are enumerated below.

(i) During each iteration of the LV-IHID algorithm, in all, $L=L_{BC}L_{TC}$ candidate combinations are available after the list operations. If the computing resources are available, it would be possible to run the IHID algorithm with all of the L candidates instead of selecting only three as illustrated in FIG. 10 and then select the best candidate with the lowest total metric TM as the chosen candidate for that iteration.

(ii) The complexity can be reduced with a slight penalty in performance by running the LV-IHID algorithm only if TC(1) ≠BC_TC(1). That is, if there is a match after the first iteration of the IHID algorithm (i.e., if there is a match after the first MSD run), then the decoder terminates the decoding and accepts the BC and the TC decoded sequences. With this modification, as SNR increases, the probability of calling the LV-IHID algorithm decreases, thereby reducing the complexity.

(iii) If the SNR of the channel is available, a further reduction in computations can be made by calling the LV-IHID algorithm only if the final metric given by the IHID algorithm, which is run first, is higher than a pres-selected threshold $V_T$. Of course the case when $V_T$ is zero, corresponds to the LV-IHID algorithm and the case when $V_T$ is infinity corresponds to the IHID algorithm.

(iv) The additional starting points can be generated using pseudo-random perturbations away from a known starting point, and simulated annealing techniques can be employed to generate the additional starting points.

Figure 15:
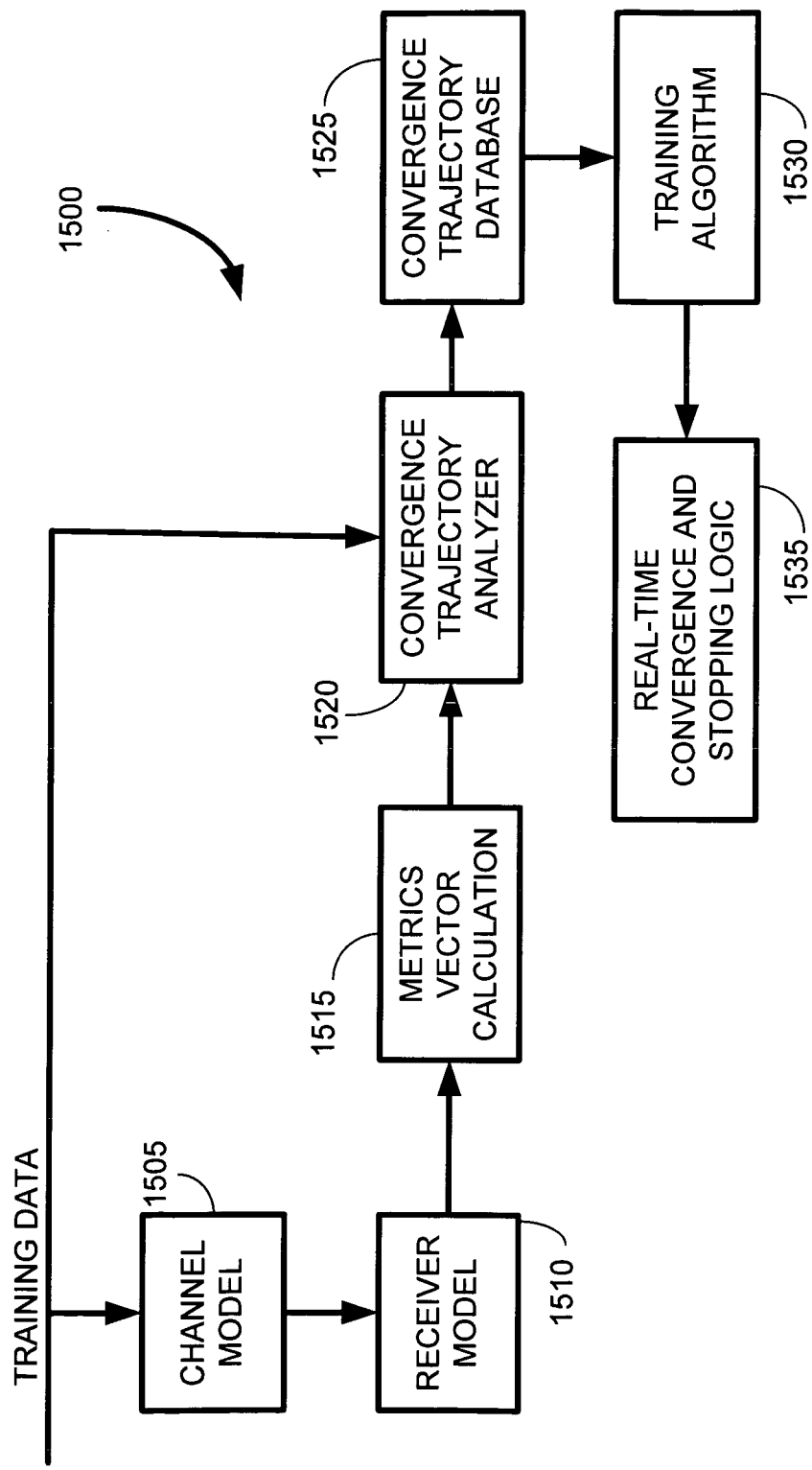
FIG. 15 is a block diagram of a computer-aided design process for use with the present invention to develop real time rules to for embodiments that accelerate convergence.

It can be noted that the above LV-IHID algorithm presents a stopping condition that was found to work well using test data. More generally, there are many ways to allow the parallel iteration threads to propagate in search of a final solution. FIG. 15 shows one way to generate accelerated convergence rules using training data and learning. The training data is modulated, for example, using the modulator 500. This is run through a channel model, such as an additive white Gaussian noise channel model 1505. An optional receiver model 1510 provides a baseband signal and/or a set of distances, and passes this received data to a metrics vector calculation unit 1515. For example, the metrics vector calculation unit can compute a vector of the total metrics computed for each of the starting points generated by the LVD in the method 1000. A convergence trajectory analyzer 1520 allows a number of parallel iteration threads to propagate forward toward a solution. The stopping condition of FIG. 10 can be seen to be a way to prune a propagating and spreading graph of parallel iteration threads. The only thread kept alive is the one whose termination point has the minimum total metric for a given set of starting points. While this propagation policy is practical and works well, other parallel propagation policies can be identified and used.

For example, if the parallel iteration threads are not pruned so much, but instead a number of termination points are allowed to be used to generate new sets of starting points, then it would be possible to find the solution faster in some cases. For each frame of training data, the one or more threads that most quickly converge to the known solution are recorded in a database 1525. Also, intermediate data like the sequence of total-metric vectors generated while converging to the solution are recorded in the database 1525. Preferably after a significant amount of such convergence-trajectory data has been collected, a learning algorithm 1530 is applied to the database to identify algorithmic rules to predict high probability trajectories based upon observations of the metrics vectors. The learning rule attempts to minimize the prediction error as measured against the known training data. This way a fuzzy logic controller, a neural network controller, or other type of known logic rule can be determined that minimized a mean-squared or similar measure of the prediction error. In real time, such a controller can be used to select a subset of parallel threads to execute in order to more likely reach the correct solution with less total computation. That is, the logic rule is designed to prune out (terminate) parallel iteration threads that have lower probability of reaching the solution if propagated by using the thread's termination point to determine further starting points. This way, using training data and computer-aided learning, a real-time convergence and stopping logic block 1535 is identified for use with enhanced versions of the methods 900 and 1000. The methods 900 and 1000 are enhanced by selecting parallel iteration threads to pursue and to terminate, to thus modify the stopping condition logic. All such modified pruning and stopping conditions are anticipated by the present invention.

Alternatively, the training data can be replaced with live data to allow for real-time updating and adaptation. In such a case, the channel model 1505 is replaced with a real channel. Also, since the true transmitted data values will be unknown, an error metric is used instead of the known training data values in the convergence trajectory analyzer 1520. The best path is taken to be the one that gets the error metric below a threshold level for a given SNR.

Another type of embodiment uses the LV-IHID algorithm to decode a coded signal that is encoded in accordance with at least two component codes, to include a first component code (CC1) and a second component code (CC2). Such a signal may be an MLC or some other type of code such as a serial or parallel concatenated code. A communication signal representative of the coded signal is received. Distances are preferably stored and an initial decoding is performed to determine a first decoded sequence. At least a portion of the first decoded sequence is then used along with information associated with the communication signal to determine a first set of starting points. Each starting point in the first set of starting points includes at least one component code decoded sequence. Next a set of parallel iteration threads are executed, where each parallel iteration thread starts from a respective starting point and terminates on a respective termination point upon satisfying a stopping condition. Each respective termination point corresponds to a respective decoded sequence and the stopping condition preferably involves: stopping a parallel iteration thread when: (i) an inherently-assumed CC2 decoded sequence is substantially equal to a first-computed CC2 decoded sequence, (ii) a previously-computed CC1 decoded sequence is substantially equal to a next-computed CC1 decoded sequence, and (iii) when a previously-computed CC2 decoded sequence is substantially equal to a next-computed second CC2 decoded sequence. Next the first decoded sequence and each termination point is evaluated to determine a respective quality factor (e.g., total metric) thereof. If the quality factor of the first decoded sequence is less than or equal to the minimum of all the quality factors of the termination points, the first decoded sequence is accepted as a decoder output sequence. As discussed in connection with FIG. 15, other parallel iteration thread propagation strategies and stopping conditions can be used.

In a preferred pruning strategy, if the quality factor of the first decoded sequence is greater than the minimum of all the quality factors of the termination points: (1) a second decoded sequence is identified to be a respective decoded sequence associated with the termination point found to have the minimum quality factor, (2) at least a portion of the second decoded sequence is used along with the information associated with the communication signal to determine a second set of starting points, (3) a set of second parallel iteration threads are performed, where each second parallel iteration thread starts from a respective starting point of the second set of starting points and terminates on a respective termination point upon satisfying the stopping condition, (4) the second decoded sequence and each termination point are evaluated to determine a respective quality factor thereof and (5) if the quality factor of the second decoded sequence is less than or equal to the minimum of all the quality factors of the termination points, the second decoded sequence is accepted as the decoder output sequence. As discussed above, other pruning strategies and stopping criteria can alternatively be used.

VI. Complexity and Delay Analysis

In this section, the complexity and computational delay of the IHID and LV-IHID algorithms are compared with each other along with soft iterative decoding and MSD, assuming the MLC scheme as discussed in connection with FIGS. 2-4.

A. Complexity Analysis

The decoding complexity is analyzed for the decoding over l intervals. The complexity of MSD is considered as a reference. Recall that MSD consists of a single Viterbi run of the BC and a single Viterbi run of each of the I and Q TCs. Further, the complexity of these Viterbi decoders is proportional to the number of states, which is 64 for the BC and 16 for each of the two TC. Since metrics need to be calculated for each transition and a comparison is needed at every state, the complexity of Viterbi decoding is about 3 times the number of states. Hence, the complexity factor of MSD is 3(64+2(16))= 288.

The complexity of the IHID algorithm can be found by finding the average number of IHID iterations required before termination of the algorithm as a result of a match. Table I lists the numbers of iterations of the IHID algorithm at different SNR values. Since a single iteration of IHID has complexity similar to a MSD run, Table I lists the complexity multiplication factor of the IHID algorithm with respect to MSD, which is one more than the final value of i in FIG. 8. As seen in FIG. 8, since the IHID algorithm can terminate in the middle of an iteration, the values listed in Table I in fact slightly over estimate the actual complexity of the IHID algorithm. It is seen, as expected, the number of iterations is higher at lower SNR.

The complexity of the LV-IHID is similarly determined by the average number of required IHID runs and by the average number of required LVD calls. A single LVD call is composed of a LVD operation on BC followed by LVD operations on each of the TC. Table I lists these average values of the LV-IHID algorithm at different values of SNR. In order to quantify the complexity of the LV-IHID algorithm, it is necessary to quantify the complexity of a single LVD operation. In order to consider both the complexity and the delay, the serial implementation of the LVD is considered here. The complexity of the LVD with $L_{BB}=2$ and $L_{TC}=4$ is about 1.3 times that of normal Viterbi decoding for the selected codes. Hence, the complexity of a single list call, which includes the BC LVD call and the two TC LVD calls, is about 1.3 times that of a single MSD run. For example, when SNR=5.4 dB, it follows from Table I that the complexity of the LV-IHID is approximately equivalent to $(5.88+(1.1)(1.3))=7.31$ MSD runs.

The complexity of the parallel implementation of soft iterative decoding is primarily determined by the complexity of the simultaneous Log-MAP algorithm on the 3 decoders, the BC decoder and each of the TC decoders. Since the complexity of the Log-MAP algorithm is about 20 times the number of states or about 6.67 times that of Viterbi decoding, a single iteration of soft decoding has the complexity of about 6.67 MSD runs. Since five iterations are needed in the simulations of FIG. 11, the complexity of soft iterative decoding is about 33.33 times that of MSD, independent of SNR. Further, this level of complexity is used at all SNR values with soft iterative decoding.

B. Delay Analysis

Recalling that the computational delay of Viterbi decoding is proportional to the number of states, and also recalling that the two tiling decoders are run simultaneously, the computational delay factor of MSD is (64+16)=80. Hence, as the computational complexity, the average computational delay of the IHID algorithm is increased by the average number of iterations listed in Table I compared with MSD.

The computational delay of LV-IHID is determined by the delay of IHID runs and the delay of the LVD calls. The delay of the serial implementation of LVD is in the order of (number of states+list length$^2$). Hence, the delay of the BC decoder with $L_{BC}=2$ is $(64+2^2)=68$, and the delay of each tile decoder with $L_{TC}=4$ is $(16+4^2)=32$. Since the two TC decoders are run in parallel, the delay involved with a single LVD call is (68+32)=100. Hence, for example, when SNR=5.4 dB, the total computational delay factor follows from Table I as $((5.88)(80)+(1.1)(100))=580.4$ which is about 7.25 times that of MSD.

The computational delay of soft iterative decoding is determined by the delay associated with MAX-Log-MAP algorithm. It is known that the delay of a MAX-Log-MAP algorithm is about 2.5 times the delay of Viterbi decoding. Since, the parallel implementation of soft iterative decoding runs all MAX-Log-MAP algorithms in parallel, the decoding delay is determined by the decoder that has the higher number of states, which is the BC decoder. Hence, the computational delay of soft iterative decoding with 5 iterations is (5)(64) (2.5)=800, and is the same for all SNR values. The computational delay of the Log-MAP algorithm is slightly higher than that of the Max-Log-MAP algorithm due to the additional time required for the table lookup operations. In this study, this additional time required for table lookup is ignored and the delay of the Log-MAP is considered to be the same as that of Max-Log-MAP which is 800 at all SNR values.

Figure 13A:
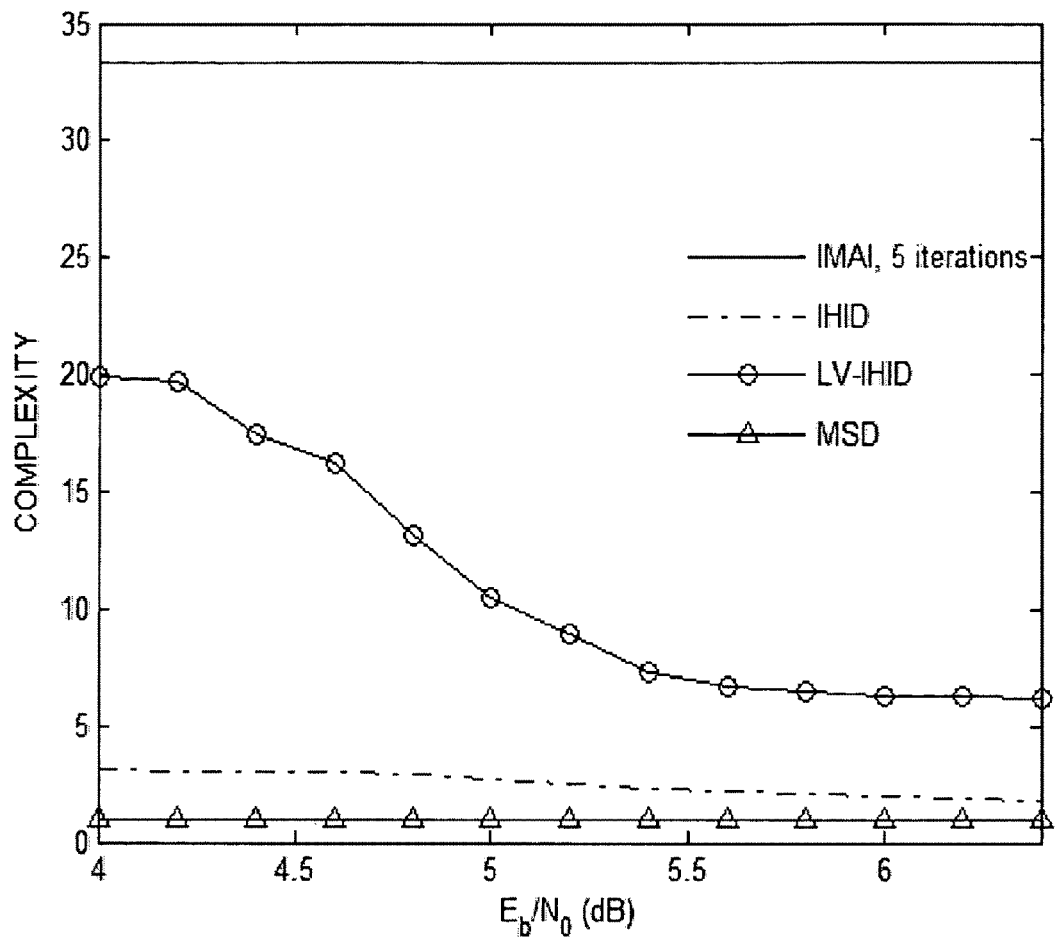
FIG. 13A is a plot showing relative computational complexity for the IHID, LV-HID, MSD, and soft iterative decoding algorithms.
Figure 13B:
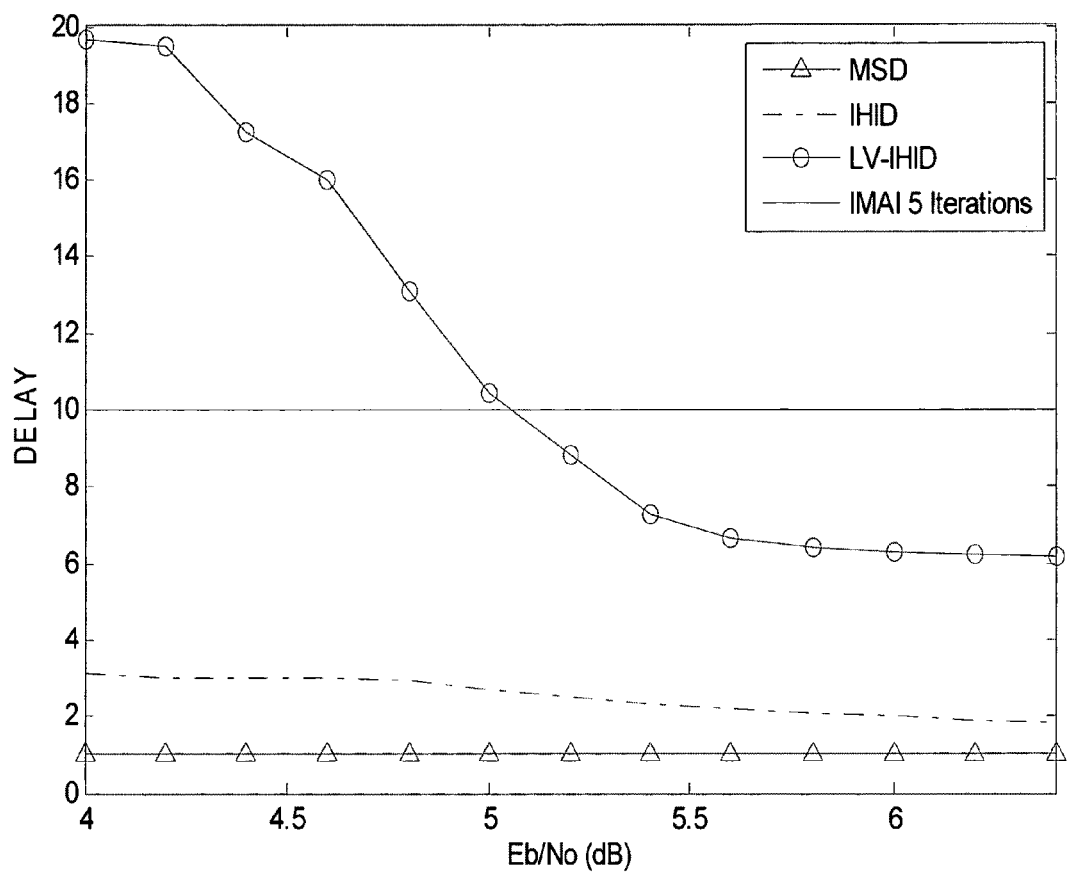
FIG. 13B is a plot showing relative computational delay complexity for the IHID, LV-HID, MSD, and soft iterative decoding algorithms.

Based on the above analysis, the computational complexity and the computational delay of the IHID and LV-IHID algorithms can be calculated at SNR values from 4 dB to 6.4 dB using Table I as shown in FIG. 12. FIGS. 13A and 13B shows the variation of the complexity and delay variations of the IHID and LV-IHID algorithms along with those of soft iterative decoding. For comparison, the corresponding variations of MSD are also plotted. It is seen that the proposed algorithms have an advantage over soft iterative decoding in terms of complexity and delay over the SNR values of practical interest (at or above 5.4 dB for LV-IHID and at or above 6.4 dB for IHID) and that advantage becomes more significant as SNR increases.

VII. System Level Embodiments

The present invention can be used in various types of communication systems. For example, a head end system communicates with one or more subscriber systems. The headend system can be a cellular base station, a cable modem headend system, a DSL modem headend system, a satellite network headend system, a packet radio network headend system, or the like. The subscriber system would be the corresponding cellular subscriber mobile telephone or smart phone, the subscriber cable modem, the subscriber DSL modem, the satellite earth station, the packet radio subscriber unit, or the like. Any such system, once improved by the IHID or LV-IHID decoders of the present invention, become systems level embodiments of the present invention.

Figure 14:
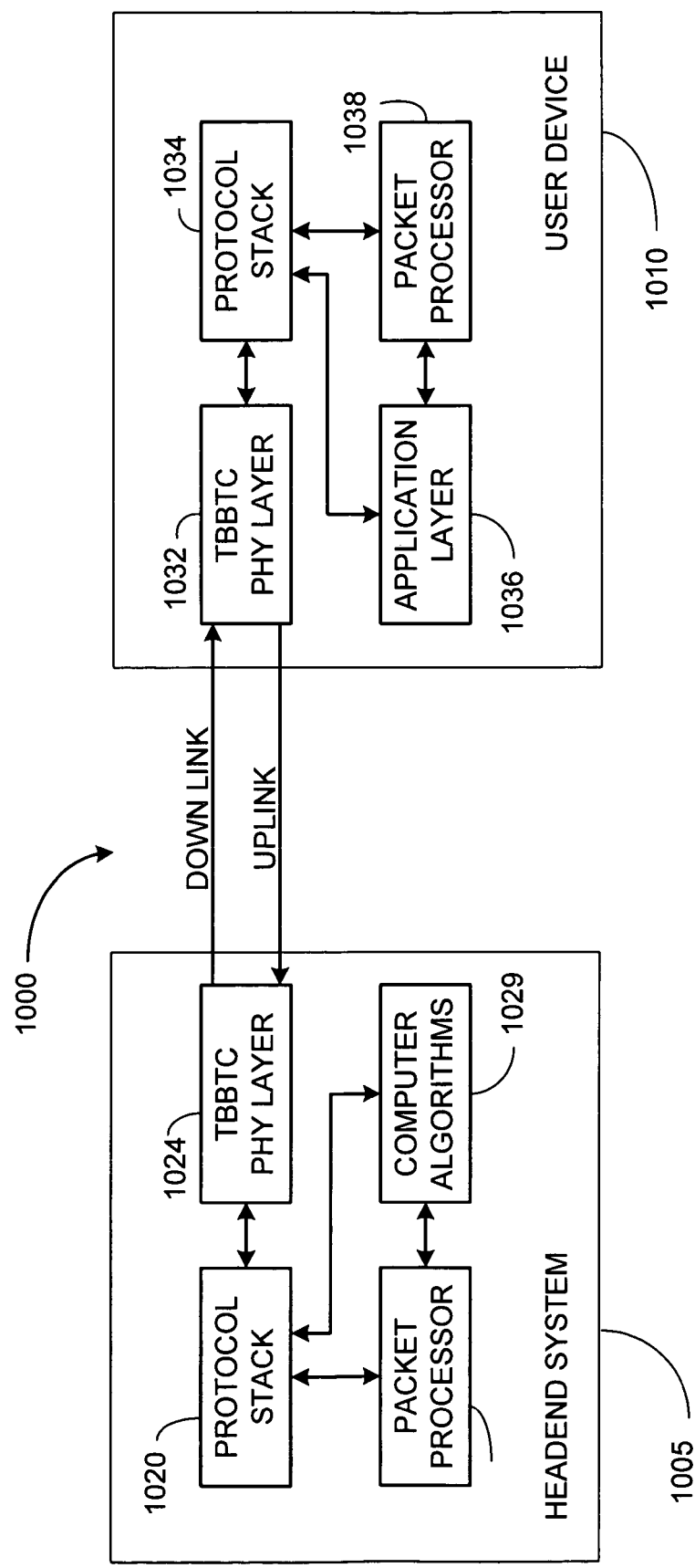
FIG. 14 is a block diagram illustrating system level embodiments of the present invention involving a headend system in communication with a subscriber system.

FIG. 14 shows an example of a system level embodiment contemplated by the present invention. In alternative system-level embodiments, the headend and the subscriber systems of FIG. 14 can be relabeled as peer systems, and the present invention can be used on peer-to-peer communications environments. In all cases, the decoded communication links of the present invention can be used to carry packet data, framed data, or digitized streaming signals such as direct sampled or compressed speech or video signals.

Although the present invention has been described with reference to specific embodiments, other embodiments may occur to those skilled in the art without deviating from the intended scope. For example, different types and sizes of signal constellations can be used, such as 16-QAM, 64-QAM, 256-QAM or QPSK, 8-PSK, or 16-PSK, or others. Also different types of codings may be used at different coding levels in addition to or instead of convolutional codes. For example, block codes or turbo codes could be at one coding level, and convolutional codes or block codes, null coding (uncoded bits) or some other coding scheme could be used at a different level. While the exemplary embodiments of the present invention are discussed in connection MLCs, it can be noted that Turbo codes and other forms of concatenated codes (serial and parallel concatenated codes) can be viewed as being isomorphic in various ways to MLCs, so that the BC and TC of the above embodiments can be viewed more generally as component codes of concatenated coding schemes. Also, other methods beside the LVD can be used to generate multiple starting points, such as simulated annealing, pseudorandom perturbations, and the like. Therefore, it is to be understood that the invention herein encompasses all such embodiments that do not depart from the spirit and scope of the invention as defined in the appended claims.

What we claim is:

1. A method of decoding a coded signal that is encoded in accordance with at least two component codes, the at least two component codes including a first component code (CC1) and a second component code (CC2), the method comprising:
   (a) receiving a communication signal representative of the coded signal, and decoding the communication signal to determine a first decoded sequence;
   (b) using at least a portion of the first decoded sequence along with information associated with the communication signal to determine a first set of starting points, wherein each starting point in the first set of starting points includes at least one component code decoded sequence;
   (c) performing a set of parallel iteration threads, where each parallel iteration thread starts from a respective starting point from the first set of starting points and terminates on a respective termination point upon satisfying a stopping condition, wherein each respective termination point corresponds to a respective decoded sequence and the stopping condition is a member of the group consisting of: stopping a parallel iteration thread when: (i) an inherently-assumed CC2 decoded sequence is substantially equal to a first-computed CC2 decoded sequence, (ii) a previously-computed CC1 decoded sequence is substantially equal to a next-computed CC1 decoded sequence, and (iii) when a previously-computed CC2 decoded sequence is substantially equal to a next-computed second CC2 decoded sequence;
   (d) evaluating the first decoded sequence and each termination point to determine a respective quality factor thereof;
   (e) if the quality factor of the first decoded sequence is less than or equal to the minimum of all the quality factors of the termination points, accepting the first decoded sequence as a decoder output sequence.

2. The method of claim 1, further comprising:
   if the quality factor of the first decoded sequence is greater than the minimum of all the quality factors of the termination points:
   (a2) identifying a second decoded sequence to be a respective decoded sequence associated with the termination point found to have the minimum quality factor;
   (b2) using at least a portion of the second decoded sequence along with the information associated with the communication signal to determine a second set of starting points, wherein each starting point in the second set distorting points includes at least one component decoded sequence;
   (c2) performing a set of second parallel iteration threads, where each second parallel iteration thread starts from a respective starting point of the second set of starting points and terminates on a respective termination point upon satisfying the stopping condition;
   (d2) evaluating the second decoded sequence and each termination point to determine a respective quality factor thereof;
   (e2) if the quality factor of the second decoded sequence is less than or equal to the minimum of all the quality factors of the termination points, accepting the second decoded sequence as the decoder output sequence.

3. The method of claim 2, wherein the steps (a)-(e) and (a2)-(e2) are carried out in order.

4. The method of claim 2, wherein the coded signal is a multilevel coded signal, the CC1 code is a lower level code, and the CC2 code is an upper level code.

5. The method of claim 4, wherein the lower level code is a building-block code (BC), and the upper level code is a tiling code (TC).

6. The method of claim 5, wherein the first decoded sequence is a multilevel decoded sequence that includes a BC decoded sequence and a TC decoded sequence.

7. The method of claim 6, wherein the BC and the TC involve convolutional codes, and the BC decoded sequence and the TC decoded sequence are decoded via respective BC and TC Viterbi decoders.

8. The method of claim 7, wherein the TC Viterbi decoder comprises an in-phase TC Viterbi decoder and a quadrature-phase TC Viterbi decoder.

9. The method of claim 7, wherein the quality factor corresponds to a path metric on a hybrid trellis that comprises a BC trellis component and a TC trellis component.

10. The method of claim 6, wherein the first and second sets of starting points are determined using at least respective first and second executions of a list Viterbi decoder (LVD) algorithm.

11. The method of claim 6, wherein the parallel iteration threads of the set of parallel iteration threads and the second set of parallel iteration threads correspond to runs of an improved hard iterative decoder (IHID) algorithm.

12. The method of claim 2, wherein the first decoded sequence includes a first component code decoded sequence and a second component code decoded sequence.

13. The method of claim 12, wherein the quality factor corresponds to a summation of distances between a sequence of samples of the communication signal and a sequence of signal constellation points identified through a mapping from the first component code decoded sequence and the second component code decoded sequence.

14. The method of claim 2, wherein the information associated with the communication signal comprises a sequence of sets of distances computed between samples of the communication signal and each of a plurality of signal constellation points.

15. The method of claim 2, wherein the first and second sets of starting points are determined using at least respective first and second executions of a list Viterbi decoder (LVD) algorithm.

16. The method of claim 2, wherein the first set of starting points are determined using at least first and second executions of a list Viterbi decoder (LVD) algorithm respectively applied to the CC1 and CC2 codes, and the second set of starting points are determined using third and fourth executions of the list Viterbi decoder (LVD) algorithm respectively applied to the CC1 and CC2 codes.

17. The method of claim 1, further comprising:
determining a set of quality factors of each starting point in the first set of starting points, wherein the set of quality factors of each starting point define a set of starting-point quality factors;
using the starting-point quality factors to determine a subset of starting points;
wherein each iteration thread of the set of parallel iteration threads starts from a starting point in the subset, and the other starting points of the first set of starting points are not used as starting points for iteration threads of the set of parallel iteration threads.

18. The method of claim 1, wherein each iteration thread of the set of parallel iteration threads starts from each and every starting point of the first set of starting points.

19. The method of claim 2, wherein at least two parallel iteration threads of the set of iteration threads are executed in at least first and second parallel hardware decoding channels.

20. The method of claim 19, wherein at least two parallel iteration threads of the set of second iteration threads are executed in the at least first and second parallel hardware decoding channels.

21. A method of decoding a coded signal that is encoded in accordance with at least two component codes, the at least two component codes including a first component code (CC1) and a second component code (CC2), the method comprising:
(a) receiving a communication signal representative of the coded signal, and decoding the communication signal to determine a first decoded sequence;
(b) using a list Viterbi decoding algorithm that uses at least a portion of the first decoded sequence along with distance information associated with the communication signal to determine a first set of starting points, wherein each starting point in the first set of starting points includes at least one component code decoded sequence;
(c) performing a set of parallel iteration threads, where each parallel iteration thread starts from a respective starting point from the first set of starting points and terminates on a respective termination point upon satisfying a stopping condition, wherein each respective termination point corresponds to a respective decoded sequence and the stopping condition is a member of the group consisting of: stopping a parallel iteration thread when: (i) an inherently-assumed CC2 decoded sequence is substantially equal to a first-computed CC2 decoded sequence, (ii) a previously-computed CC1 decoded sequence is substantially equal to a next-computed CC1 decoded sequence, and (iii) when a previously-computed CC2 decoded sequence is substantially equal to a next-computed second CC2 decoded sequence;
(d) evaluating the first decoded sequence and each termination point to determine a respective quality factor thereof;
(e) if the quality factor of the first decoded sequence is less than or equal to the minimum of all the quality factors of the termination points, accepting the first decoded sequence as a decoder output sequence.

22. The method of claim 21, further comprising:
if the quality factor of the first decoded sequence is greater than the minimum of all the quality factors of the termination points:
(a2) identifying a second decoded sequence to be a respective decoded sequence associated with the termination point found to have the minimum quality factor;
(b2) using at least a portion of the second decoded sequence along with the information associated with the communication signal to determine a second set of starting points, wherein each starting point in the second set of starting points includes at least one component decoded sequence;
(c2) performing a set of second parallel iteration threads, where each second parallel iteration thread starts from a respective starting point of the second set of starting points and terminates on a respective termination point upon satisfying the stopping condition;
(d2) evaluating the second decoded sequence and each termination point to determine a respective quality factor thereof;
(e2) if the quality factor of the second decoded sequence is less than or equal to the minimum of all the quality factors of the termination points, accepting the second decoded sequence as the decoder output sequence.

23. The method of claim 21, wherein the stopping condition further comprises stopping when an inherently assumed component sequence is substantially equal to a firstly decoded component sequence.

24. The method of claim 22, wherein the first set of starting points are determined using first and second executions of the list Viterbi decoder (LVD) algorithm applied to the first and second component codes, and the second set of starting points are determined using third and fourth executions of the list Viterbi decoder (LVD) algorithm applied to the first and second component codes.

25. The method of claim 22, wherein the coded signal is a multilevel coded signal, the first component code is a lower level code, and the second component code is an upper level code.

26. The method of claim 25, wherein the lower level code is a building-block code (BC), and the upper level code is a tiling code (TC).

27. The method of claim 26, wherein the first decoded sequence is a multilevel decoded sequence that includes a BC decoded sequence and a TC decoded sequence.

28. The method of claim 27, wherein the BC and the TC involve convolutional codes, and the BC decoded sequence and the TC decoded sequence are decoded via respective BC and TC Viterbi decoders.

29. The method of claim 28, wherein the TC Viterbi decoder comprises an in-phase TC Viterbi decoder and a quadrature-phase TC Viterbi decoder.

30. The method of claim 28, wherein the quality factor corresponds to a path metric on a hybrid trellis that comprises a BC trellis component and a TC trellis component.

31. The method of claim 27, wherein the parallel iteration threads of the set of parallel iteration threads and the second set of parallel iteration threads correspond to runs of an improved hard iterative decoder (IHID) algorithm.

* * * * *